United States Patent
Newman et al.

(10) Patent No.: US 11,397,621 B2
(45) Date of Patent: *Jul. 26, 2022

(54) SYSTEM AND METHOD FOR SERVICE LIMIT INCREASE FOR A MULTI-TENANT CLOUD INFRASTRUCTURE ENVIRONMENT

(71) Applicant: ORACLE INTERNATIONAL CORPORATION, Redwood Shores, CA (US)

(72) Inventors: Philip Newman, Seattle, WA (US); Alok Goyal, Seattle, WA (US); Rajesh Basa, Seattle, WA (US); Marek Czajka, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/006,639

(22) Filed: Aug. 28, 2020

(65) Prior Publication Data

US 2021/0067423 A1  Mar. 4, 2021

Related U.S. Application Data

(60) Provisional application No. 62/900,267, filed on Sep. 13, 2019, provisional application No. 62/894,316, filed on Aug. 30, 2019.

(51) Int. Cl.
*G06F 9/50* (2006.01)
*G06F 21/31* (2013.01)
(Continued)

(52) U.S. Cl.
CPC .......... *G06F 9/5072* (2013.01); *G06F 9/5005* (2013.01); *G06F 9/505* (2013.01);
(Continued)

(58) Field of Classification Search
CPC ............. H04L 41/5038; H04L 41/5048; H04L 41/5077; H04L 41/5045; H04L 67/10;
(Continued)

(56) References Cited

U.S. PATENT DOCUMENTS 8,429,630 B2   4/2013   Nickolov et al.
9,058,198 B2   6/2015   McGrath et al.
(Continued)

OTHER PUBLICATIONS

"AWS service quotas", AWS General Reference, retrieved from https://docs.aws.amazon.com/general/latest/gr/aws_service_limits.html on Jul. 31, 2020, 1 page.
(Continued)

*Primary Examiner* — Le H Luu
(74) *Attorney, Agent, or Firm* — Tucker Ellis LLP

(57) ABSTRACT

Systems and methods described herein for automatic limit service increase in a multi-tenant cloud infrastructure environment. The systems and methods described herein provide for automatic approval of limit service increase requests that are either automatically generated based upon a tenant's usage of resources within the cloud infrastructure environment, or are received via, e.g., a user portal. Such automatic approval can be based upon a set of maximal limits that are computed based upon the tenant's current usage, level of subscription, or hard limit values.

20 Claims, 11 Drawing Sheets

(51) Int. Cl.
*H04L 43/55* (2022.01)
*H04L 41/5041* (2022.01)
*H04L 67/10* (2022.01)
*H04L 41/50* (2022.01)
*H04L 47/78* (2022.01)
*H04L 47/70* (2022.01)

(52) U.S. Cl.
CPC .......... *G06F 9/5027* (2013.01); *G06F 9/5077* (2013.01); *G06F 21/31* (2013.01); *H04L 41/5038* (2013.01); *H04L 41/5048* (2013.01); *H04L 41/5077* (2013.01); *H04L 47/782* (2013.01); *H04L 47/829* (2013.01); *H04L 67/10* (2013.01); *G06F 2209/504* (2013.01); *G06F 2209/5022* (2013.01); *G06F 2221/2141* (2013.01)

(58) Field of Classification Search
CPC ..... H04L 67/1002; H04L 67/16; H04L 67/28; H04L 47/782; H04L 47/829; H04L 43/0817; H04L 9/16; G06F 9/5005; G06F 9/505; G06F 9/5072; G06F 9/5077; G06F 2209/5022; G06F 2209/504; G06F 11/3006; G06F 16/122; G06F 16/213; G06F 16/2474
See application file for complete search history.

(56) References Cited

U.S. PATENT DOCUMENTS

| | | | |
|---|---|---|---|
| 9,112,777 | B1 | 8/2015 | Barclay et al. |
| 9,268,584 | B2 | 2/2016 | Atchison et al. |
| 9,519,595 | B1 | 12/2016 | Zeldin et al. |
| 10,089,476 | B1 | 10/2018 | Roth et al. |
| 10,110,506 | B2 | 10/2018 | Kasso et al. |
| 10,242,370 | B2 | 3/2019 | Meek |
| 11,003,497 | B2 | 5/2021 | Xiao et al. |
| 2014/0007178 | A1 | 1/2014 | Gillum et al. |
| 2014/0297781 | A1 | 10/2014 | Brand |
| 2015/0067128 | A1 | 3/2015 | Naseh et al. |
| 2015/0089065 | A1 | 3/2015 | Kasso et al. |
| 2015/0120938 | A1 | 4/2015 | Mordani et al. |
| 2015/0188840 | A1 | 7/2015 | Xiao |
| 2015/0228003 | A1* | 8/2015 | Lyoob .................. H04L 67/16 705/26.64 |
| 2015/0249707 | A1* | 9/2015 | Morgan .............. H04L 67/1002 709/226 |
| 2015/0286505 | A1 | 10/2015 | Liu et al. |
| 2016/0179576 | A1 | 6/2016 | Zhou et al. |
| 2016/0197880 | A1 | 7/2016 | Korman et al. |
| 2018/0183664 | A1* | 6/2018 | Vano Newman ..... G06F 16/122 |
| 2018/0316552 | A1* | 11/2018 | Subramani Nadar ........................ H04L 41/5045 |
| 2018/0322022 | A1 | 11/2018 | Garlapati |
| 2018/0367630 | A1* | 12/2018 | Wei .................. H04L 67/28 |
| 2019/0034642 | A1 | 1/2019 | Roth et al. |
| 2019/0102849 | A1* | 4/2019 | Bertot ................ G06F 16/2474 |
| 2019/0158423 | A1* | 5/2019 | Li ...................... H04L 43/0817 |
| 2019/0199696 | A1* | 6/2019 | Bansal ..................... H04L 9/16 |
| 2019/0207945 | A1 | 7/2019 | Yuan et al. |
| 2019/0228134 | A1* | 7/2019 | Ohhata ............. G06F 11/3006 |
| 2019/0295140 | A1* | 9/2019 | Nedeltchev ............ H04L 67/16 |
| 2019/0332587 | A1* | 10/2019 | Lam ...................... G06F 16/213 |
| 2021/0044540 | A1* | 2/2021 | Rushton ................ G06F 9/5077 |

OTHER PUBLICATIONS

"Azure Arc", Microsoft Azure, retrieved from https://azure.microsoft.com/en-us/services/azure-arc/ on Jun. 4, 2021, 23 pages.
"Managing AWS Regions", AWS General Reference, retrieved from https://docs.aws.amazon.com/general/latest/gr/rande-manage.html on Jul. 31, 2020, 3 pages.
"Nested quotas", OpenStack Docs, retrieved from https://docs.openstack.org/mitaka/config-reference/block-storage/nested-quota.html on Jun. 4, 2021, 4 pages.
Neto, Andre Correa; "Oracle Cloud Infrastructure Compartments", A-Team Chronicles, published May 9, 2019, retrieved from https://www.ateam-oracle.com/oracle-cloud-infrastructure-compartments, 10 pages.
"OCI-CLI-oci limits—Readme", retrieved from https://raw.githubusercontent.com/oracle/oci-cli/v2.519/services/limits/docs/inline-help/limits.txt on Oct. 20, 2020, 7 pages.
Oracle Cloud Infrastructure Documentation, "Compartment Quotas", retrieved from https://docs.cloud.oracle.com/en-us/iaas/Content/General/Concepts/resourcequotas.htm on Oct. 20, 2020, 19 pages.
Oracle Cloud Infrastructure Documentation: Release Notes, "Compartment Quotas", retrieved from https://docs.cloud.oracle.com/en-us/iaas/releasenotes/changes/fc527066-631d-428d-980e-fd7f576fc5c8/ on Oct. 20, 2020, 2 pages.
"Oracle / oci-cli", retrieved from https://github.com/oracle/oci-cli/blob/v2.5.19/services/limits/docs/inline-help/limits.txt on Oct. 22, 2020, 5 pages.
Oracle / oci-cli, "Release 2.5.19", retrieved from https://github.com/oracle/oci-cli/releases/tag/v2.5.19 on Oct. 20, 2020, 2 pages.
"Quota Plugin", Apache CloudStack Administration Demonstration 4.8, retrieved from http://docs.cloudstack.apache.org/projects/cloudstack-administration/en/4.8/plugins/quota.html on Jun. 4, 2021, 4 pages.
Raghuram, Sirish; Multi-Region Management (and Multi-Hypervisor Too), Platform 9 Blog, published Feb. 10, 2016, retrieved from https://platform9.com/blog/multi-region-management/ on Jun. 4, 2021, 12 pages.
"Stress-Free AWS Infrastructure Management", AWS Cloud Infrastructure, retrieved from https://www.clouddaddy.com/our-solutions/infrastructure-management on Jun. 4, 2021, 9 pages.
"Tagging AWS resources", AWS General Reference, retrieved from https://docs.aws.amazon.com/general/latest/gr/aws_tagging.html on Jul. 31, 2020, 5 pages.
International Search Report and Written Opinion of the International Searching Authority dated Nov. 3, 2020 for PCT Application No. PCT/US2020/045516, 14 pages.
International Search Report and the Written Opinion of the International Searching Authority dated Nov. 4, 2020 for PCT Application No. PCT/2020/045515, 18 pages.
International Search Report and Written Opinion of the International Searching Authority dated Nov. 20, 2020 for PCT Application No. PCT/US2020/045514, 16 pages.
United States Patent and Trademark Office, Office Action dated Apr. 30, 2021 for U.S. Appl. No. 16/986,164, 22 pages.
Google Cloud, Google Cloud Documentation, "Working with quotas", 13 pages, retrieved on Oct. 22, 2021 retrieved from: <https://cloud.google.com/docs/quota>.
United States Patent and Trademark Office, Office Communication dated Oct. 28, 2021 for U.S. Appl. No. 16/986,163, 12 pages.
United States Patent and Trademark Office, Office Communication dated Dec. 22, 2021 for U.S. Appl. No. 17/006,637, 9 pages.
United States Patent and Trademark Office, Notice of Allowance and Fee(s) Due dated Aug. 16, 2021 for U.S. Appl. No. 16/986,164, 10 pages.
Oracle, Cloud Infrastructure, User Guide, Nov. 9, 2017, Chapters 1-2, pp. 1-37, pp. 1284-1308, total 62 pages.
Oracle, Oracle Cloud Infrastructure Documentation, Service Limits, 13 pages, retrieved on Jul. 29, 2019, from: <https://docs.cloud.oracle.com/iaas/Content/General/Concepts/servicelimits htm>.

* cited by examiner

US 11,397,621 B2

SYSTEM AND METHOD FOR SERVICE LIMIT INCREASE FOR A MULTI-TENANT CLOUD INFRASTRUCTURE ENVIRONMENT

CLAIM OF PRIORITY AND CROSS REFERENCE TO RELATED APPLICATIONS

This application claims the benefit of priority to U.S. Provisional Patent Applications entitled "SYSTEM AND METHOD FOR AUTOMATIC SERVICE LIMIT INCREASE FOR A MULTI-TENANT CLOUD INFRASTRUCTURE ENVIRONMENT", Application No. 62/894,316, filed Aug. 30, 2019; and to U.S. Provisional Patent Applications entitled "SYSTEM AND METHOD FOR CROSS REGION RESOURCE MANAGEMENT FOR REGIONAL INFRASTRUCTURE RESOURCES IN A CLOUD INFRASTRUCTURE ENVIRONMENT", Application No. 62/900,267, filed Sep. 13, 2019, each of which above applications are herein incorporated by reference.

This application is related to each of the following applications: U.S. patent application entitled "SYSTEM AND METHOD FOR TAG BASED RESOURCE LIMITS OR QUOTAS IN A CLOUD INFRASTRUCTURE ENVIRONMENT", application Ser. No. 16/986,158, filed Aug. 5, 2020; U.S. patent application entitled "SYSTEM AND METHOD FOR TAG BASED REQUEST CONTEXT IN A CLOUD INFRASTRUCTURE ENVIRONMENT", application Ser. No. 16/986,160, filed Aug. 5, 2020; U.S. patent application entitled "SYSTEM AND METHOD FOR COMPARTMENT QUOTAS IN A CLOUD INFRASTRUCTURE ENVIRONMENT", application Ser. No. 16/986,162, filed Aug. 5, 2020; U.S. patent application entitled "SYSTEM AND METHOD FOR SUPPORTING A QUOTA POLICY LANGUAGE IN A CLOUD INFRASTRUCTURE ENVIRONMENT", application Ser. No. 16/986,163, filed Aug. 5, 2020; U.S. patent application entitled "SYSTEM AND METHOD FOR SUPPORTING A USAGE CALCULATION PROCESS IN A CLOUD INFRASTRUCTURE ENVIRONMENT", application Ser. No. 16/986,164, filed Aug. 5, 2020; and U.S. patent application entitled "SYSTEM AND METHOD FOR CROSS REGION RESOURCE MANAGEMENT FOR REGIONAL INFRASTRUCTURE RESOURCES IN A CLOUD INFRASTRUCTURE ENVIRONMENT", application Ser. No. 17/006,637, filed Aug. 28, 2020; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to cloud infrastructure environments, such as Infrastructure as a Service (IaaS), and are particularly related to systems and methods for providing automatic service limit increase for multi-tenant cloud infrastructure environments.

BACKGROUND

Cloud infrastructure environments can comprise sets of complementary cloud services that enable users and clients (throughout the specification, the terms "clients" and "customers" can be used interchangeably) to build and run a wide range of applications and services in a highly available hosted environment.

Year to year, more and more businesses and organizations are migrating mission critical applications and systems to a cloud infrastructure environment. There are various reasons for this shift. For example, many businesses are moving to the cloud in order to reduce the cost and complexity of operating, maintaining, and building out on-premise infrastructure. As well, cloud infrastructure also allows for a more rapid information technology (IT) delivery mechanism. Some businesses and organizations additionally see the cloud infrastructure environment as a means to gain a leg up on competition by adapting to a nimbler system.

Within IaaS (Infrastructure as a Service) models, a cloud provider can provide, host, and manage infrastructure components that would, in traditional settings, be on-premise at each customer's/client's location. Such components traditionally provided on-premise can include hardware, for example, data warehouses and data centers, servers, storage, networking hardware, as well as software, such as virtualization software.

IaaS providers can, in addition to providing hardware and software that would traditionally be on-premise, also provide services to their clients and customers. As an example, clients and customers can be allowed to tailor their IaaS subscription to fit their needs, which then in turn allows for detailed and broken-down billing and invoicing. IaaS can also support features such as load balancing, redundancy, replication and recovery. Because such services are offered and supported by the IaaS provider (and not the customer), this leaves clients and customers to be more focused on improving their business by pushing more into automation and orchestration for their services.

Cloud infrastructures enable users and clients to seamlessly run traditional enterprise applications along with cloud-native apps, all on the same platform, reducing operational overhead and enabling direct connectivity between both types of workloads.

SUMMARY

Described herein are systems and methods for automatic service limit increases in a multi-tenant cloud infrastructure environment. The systems and methods described herein provide for automatic approval of limit service increase requests that are either automatically generated based upon a tenant's usage of resources within the cloud infrastructure environment and thus that may be transparent to the tenant, or by requests that are received via, e.g., a user portal and that are automatically granted. Such automatic approval can be based upon a set of maximal limits that are computed based upon the tenant's current usage, level of subscription, or hard limit values.

In accordance with an example embodiment, systems and methods are provided for user-transparent automatic service limit adjustment, wherein contractual or other service limits placed on resource use and/or provisioning allocated to tenants of a cloud infrastructure environment are automatically adjusted based on a set of rules applied to tenant cloud accounts before customers of the tenants may have a need to request additional resources and/or before the service limits allocated to the tenants are reached. In that way, beneficially, users of selected tenants such as for example users of trusted tenants may easily and efficiently provision or otherwise use resources without the disruption associated with supervisory manual review and approval of the resource requests when the tenant is at or near to the contractual or other service limits placed on the resources.

In accordance with an example embodiment, the tenants of the multi-tenant cloud infrastructure environment may opt out of the user-transparent automatic service limit adjustment system and method so that service limit increases may be established in other ways.

In accordance with another example embodiment, systems and methods are provided for user-directed automatic service limit adjustment, wherein requests from users of selected tenants such as for example users of trusted tenants to increase contractual or other service limits placed on resource use and/or provisioning allocated to tenants of a cloud infrastructure environment are automatically granted to the requesting user. In that way, beneficially, users of trusted or other tenants may easily and efficiently provision or otherwise use resources by simply requesting an increase and without the disruption associated with supervisory manual review and approval of the resource requests when the tenant is at or near to the contractual or other service limits placed on the resources.

DETAILED DESCRIPTION

As described above, cloud infrastructure environments can comprise sets of complementary cloud services that enable users and clients to build and run a wide range of applications and services in a highly available hosted environment.

Figure 1:
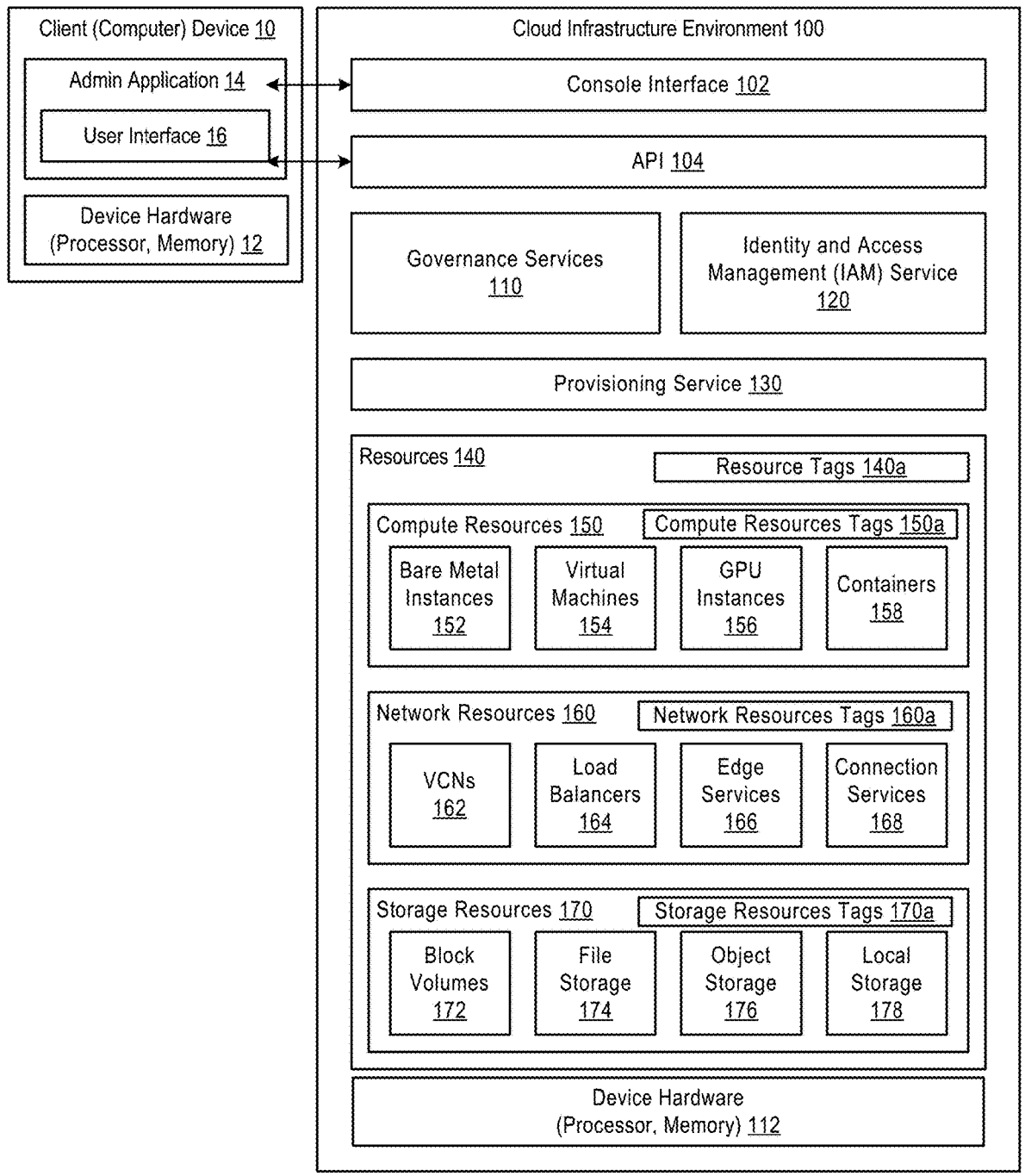
FIG. 1 illustrates a system for providing a cloud infrastructure environment, in accordance with an embodiment.

FIG. 1 shows a system for providing a cloud infrastructure environment, in accordance with an embodiment.

In accordance with an embodiment, a cloud infrastructure environment 100, which can be run on a number of hardware and software resources 112, can comprise a console interface 102 and an API 104. In addition, the cloud infrastructure environment 100 can support a number of governance services 110, an identity and access management (IAM) service 120, and a provisioning service 130. The cloud infrastructure environment 100 can also support a number of resources 140, e.g., in layers, such as a computer resource layer 150, a network resource layer 160, and a storage resource layer 170. The cloud infrastructure environment 100 can also support a number of tags associated with each of the resources including for example resource tags 140a associated with the resources 140 in general, computer resource tags 150a associated with the computer resources 150, network resource tags 160a associated with the network resources 160, and storage resource tags 170a associated with the storage resources 170.

In accordance with an embodiment, a client device, such as a computing device 10 having device hardware (processor, memory . . . etc.) 12, can communicate with the cloud infrastructure environment via a network, such as a wide area network (WAN), a local area network (LAN), or the internet, for example. The client device can comprise an administrator application 14, which can comprise a user interface 16.

In accordance with an embodiment, within the cloud infrastructure environment, tenancy can be supported. On registration and deployment, a tenancy can be created for each client/customer, which can comprise a secure and isolated partition within the cloud infrastructure in which the client can create, organize, and administer their cloud resources.

In accordance with an embodiment, the console interface 102 and the API 104 can provide clients with access to, and control over respective portions of the could infrastructure environment. In accordance with an embodiment, the console interface can comprise an intuitive, graphical interface that lets clients create and manage resources, instances, cloud networks, and storage volumes, as well as manage users associated with the client, and set permissions within the client scope. As well, the API 104 can compromise, for example, a REST API that utilizes HTTPS (hypertext transfer protocol secure).

In accordance with an embodiment, one example of a console interface or API can be a configuration management tool (e.g., Ansible). The configuration management tool can be used for cloud infrastructure provisioning, orchestration, and configuration management. Configuration management tools can allow clients to automate configuring and provisioning of the cloud infrastructure, deploying and updating software assets, and orchestrating complex operational processes.

In accordance with an embodiment, the governance services 110 of the cloud infrastructure environment provides clients tools to help clients enable simple resource governance, manage costs, and control access to the cloud infrastructure. As an example, the governance services provide for tagging which can allow for clients to apply tags to their resources for informational or operational reasons. Defined tags can be controlled to avoid incorrect tags from being applied to resources. Tags can also provide a flexible targeting mechanism for administrative scripts. As well, the governance services can allow for managed budgets, and track actual and forecasted spend all from one place. This allows clients to stay on top of usage with a cost analysis dashboard, and filter by compartments and tags to analyze spending by departments, teams, and projects. Such data can as well be exported for detailed resource utilization reporting and integration with an existing cloud management and business intelligence tools. The governance services can also log events that can later be retrieved, stored, and analyzed for security, compliance, and resource optimization across the cloud infrastructure entitlements and compartments.

In accordance with an example embodiment, the governance services provide for tagging allowing the clients, administrators and the like to apply tags to their resources for informational or operational reasons as the resources are being instantiated. In accordance with a further example embodiment, the governance services also provide the tagging allowing the clients and others to apply tags to their resources for informational or operational reasons after the resources have been instantiated, thereby allowing for retroactive enforcement of resource quotas or limits in systems using the tags.

In accordance with an embodiment, the identity and access management (IAM) service 120 can create a user profile for each client/customer/user in the IAM service with associated with user credential (e.g., username and password). Clients can be granted administrator privileges in the cloud infrastructure as well via the IAM service.

In accordance with an embodiment, the identity and access management service can be integrated with the cloud infrastructure environment. Upon a client registering. The IAM service can create a separate user credential in an identity service, which can then allow for single sign on to the cloud infrastructure service as well as access to additional cloud services.

In accordance with an embodiment, the provisioning service 130 can provision, for example, a tenancy within cloud infrastructure service, such as within the resources 140. The provisioning service can be accessed and controlled through, for example, the console interface or via one or more APIs, such as API 104. The provisioning service can allow for clients to provision and manage compute hosts, which can be referred to as instances. Clients can launch instances as needed to meet compute and application requirements. After a client launches an instance, the provisioned instance can be accessed from, for example, a client device. The provisioning service can also provide for restarting an instance, attaching and detaching volumes from an instance, and terminating an instance.

In accordance with an embodiment, resources 140 provided by a cloud infrastructure environment can be broken down into a plurality of layers, such as a compute resources layer 150, a network resources layer 160, and a storage resource layer 170.

In accordance with an embodiment, the compute resources layer 150 can comprise a number of resources, such as, for example, bare metal instances 152, virtual machines 154, edge services 156, and containers 158. The compute resources layer can be used to, for example, provision and manage bare metal compute instances, provision instances as needed to deploy and run applications, just as in an on-premises data center. The cloud infrastructure environment 100 in accordance with the example embodiment supports a number of tags 140*a* associated with each of the resources including for example computer resource tags 150*a* associated with the computer resources 150 including for example, the bare metal instances 152, the virtual machines 154, the edge services 156, and the containers 158.

In accordance with an embodiment, the cloud infrastructure environment can provide control of one or more physical host ("bare metal") machines within the compute resources layer. Bare metal compute instances run directly on bare metal servers without a hypervisor. When a bare metal compute instance is provisioned, the client can maintain sole control of the physical CPU, memory, and network interface card (NIC). The bare metal compute instance can be configured and utilize the full capabilities of each physical machine as if it were hardware running in an on-premise own data center. As such, bare metal compute instances are generally not shared between tenants.

In accordance with an embodiment, bare metal compute instances can provide, via the associated physical hardware as opposed to a software-based virtual environment, a high level of security and performance.

In accordance with an embodiment, the cloud infrastructure environment can provide control of a number of virtual machines within the compute resources layer. A virtual machine compute host can be launched, for example, from an image that can determine the virtual machines operation system as well as other software. The types and quantities of resources available to a virtual machine instance can be determined, for example, based upon the image that the virtual machine was launched from.

In accordance with an embodiment, a virtual machine (VM) compute instance can comprise an independent computing environment that runs on top of physical bare metal hardware. The virtualization makes it possible to run multiple VMs that are isolated from each other. VMs can be used, for example, for running applications that do not require the performance and resources (CPU, memory, network bandwidth, storage) of an entire physical machine.

In some embodiments, virtual machine instances can run on the same hardware as a bare metal instance, which can provide leverage over using the same cloud-optimized hardware, firmware, software stack, and networking infrastructure.

In accordance with an embodiment, the cloud infrastructure environment can provide a number of graphical processing unit (GPU) compute instances within the compute resources layer. Accelerated computing requires consistently-fast infrastructure across every service. With GPU instances, clients can process and analyze massive data sets more efficiently, making them useful for complex machine learning (ML), artificial intelligence (AI) algorithms, and many industrial HPC applications. GPU compute instances can be provisioned as either virtualized compute instances (where multiple GPU compute instances share the same bare metal hardware), or as bare metal instances which provide dedicate hardware for each GPU compute instance.

In accordance with an embodiment, the cloud infrastructure environment can provide a number of containerized compute instances within the compute resources layer. A standalone container engine service can be used to build and launch containerized applications to the cloud. The container service can be used, for example, to build, deploy, and manage cloud-native applications. The container service can specify the compute resources that the containerized applications require, and the container engine can then provision, via the provisioning service, the required compute resources for use within the cloud infrastructure environment (e.g., in the context of a tenancy).

In accordance with an embodiment, one such container service engine that can be used is Kubernetes, an open-source system for automating deployment, scaling, and management of containerized applications across clusters of hosts. Such container services can group the containers that make up an application into logical units for easy management and discovery.

In accordance with an embodiment, the network resources layer 160 can comprise a number of resources, such as, for example, virtual cloud networks (VCNs) 162, load balancers 164, edge services 166, and connection services 168. The cloud infrastructure environment 100 in accordance with the example embodiment supports a number of tags associated with each of the resources including for example resource tags 140*a* associated with the resources 140 in general, and network resource tags 160*a* associated with the virtual cloud networks (VCNs) 162, the load balancers 164, the edge services 166, and the connection services 168.

In accordance with an embodiment, the cloud infrastructure environment can provide a number of virtual cloud networks 162 at the networking resources layer. A virtual cloud network can comprise a virtual version of a traditional network including subnets, route tables, and gateways on which client instances can run. A cloud network resides within a single region but includes all the region's availability domains. Each subnet defined in the cloud network can either be in a single availability domain or span all the availability domains in the region (recommended). At least one cloud network can be configured before launching instances. In certain embodiments, VCNs can be configured via an internet gateway to handle public traffic, a VPN connection, or a fast connect service to securely extend on-premises network.

In accordance with an embodiment, the cloud infrastructure environment can provide a number of load balancers 164 at the networking resources layer. A load balancing service can provide automated traffic distribution from one entry point to multiple servers reachable from a virtual cloud network (VCN). Various load balances can provide a public or private IP address, and provisioned bandwidth.

In accordance with an embodiment, a load balancer can improved resource utilization, scaling, and help ensure high availability. Multiple load balancing policies can be configured, and application-specific health checks can be provided to ensure that the load balancer directs traffic only to healthy instances. The load balancer can reduce maintenance window by draining traffic from an unhealthy application server before it is removed from service for maintenance.

In accordance with an embodiment, a load balancing service enables creation of a public or private load balancer in conjunction with a VCN. A public load balancer has a public IP address that is accessible from the internet. A private load balancer has an IP address from the hosting subnet, which is visible only within the VCN. Multiple listeners can be configured for an IP address to load balance transport different layers of traffic (e.g., Layer 4 and Layer 7 (TCP and HTTP) traffic). Both public and private load balancers can route data traffic to any backend server that is reachable from the VCN.

In accordance with an embodiment, a public load balancer can accept traffic from the internet, a public load balance can be created that is assigned a public address, which serves as the entry point for incoming traffic.

In accordance with an embodiment, a public load balancer is regional in scope. If a region includes multiple availability domains, a public load balancer can have, for example, a regional subnet, or two availability domain-specific (AD-specific) subnets, each in a separate availability domain. With a regional subnet, the load balancer can creates a primary load balancer and a standby load balancer, each in a different availability domain, to ensure accessibility even during an availability domain outage. If a load balance is created in multiple AD-specific subnets, one subnet can host the primary load balancer and the other hosts a standby load balancer. If the primary load balancer fails, the public IP address can switch to the secondary load balancer. The service treats the two load balancers as equivalent.

In accordance with an embodiment, if a region includes only one availability domain, the service requires just one subnet, either regional or AD-specific, to host both the primary and standby load balancers. The primary and standby load balancers can each have a private IP address from the host subnet, in addition to the assigned floating public IP address. If there is an availability domain outage, the load balancer has no failover.

In accordance with an embodiment, private load balances can also be provided so as to isolate the load balancer from the internet and simplify security posture. The load balancer service can assign a private address to the load balancer that serves as the entry point for incoming traffic.

In accordance with an embodiment, a private load balancer can be created by a service to service only one subnet to host both the primary and standby load balancers. The load balancer can be regional or AD-specific, depending on the scope of the host subnet. The load balancer is accessible only from within the VCN that contains the host subnet, or as further restricted by security rules.

In accordance with an embodiment, the assigned floating private IP address is local to the host subnet. The primary and standby load balancers each require an extra private IP address from the host subnet.

In accordance with an embodiment, if there is an availability domain outage, a private load balancer created in a regional subnet within a multi-AD region provides failover capability. A private load balancer created in an AD-specific subnet, or in a regional subnet within a single availability domain region, has no failover capability in response to an availability domain outage.

In accordance with an embodiment, the cloud infrastructure environment can provide a number of edge services 166 at the networking resources layer. In general, edge services comprise a number of services that allow clients to manage, secure, and maintain domains and endpoints. These include, for example, DNS (domain name system), DDoS (distributed denial of service) protection, and email delivery. These services enable clients to optimize performance, thwart cyberattacks, and scale communication.

In accordance with an embodiment, the cloud infrastructure environment can provide a number of connection services 168 at the networking resources layer. Such connection services can provide an easy way to create a dedicated, private connection between a client data center or existing network and the cloud infrastructure environment. The connection service can provide high bandwidth, and a reliable and consistent network.

In accordance with an embodiment, the storage resources layer 170 can comprise a number of resources, such as, for example, block volumes 172, file storage 174, object storage 176, and local storage 178. The cloud infrastructure environment 100 in accordance with the example embodiment supports a number of tags associated with each of the resources including for example resource tags 140*a* associated with the resources 140 in general, and storage resource tags 170*a* associated with the block volumes 172, the file storage 174, the object storage 176, and the local storage 178.

In accordance with an embodiment, block volumes 172 provide high-performance network storage capacity that supports a broad range of I/O intensive workloads. Clients can use block volumes to expand the storage capacity of compute instances, to provide durable and persistent data storage that can be migrated across compute instances, and to host large databases.

In accordance with an embodiment, file storage 174 allows clients to create a scalable, distributed, enterprise-grade network file system. File storage supports semantics, snapshots capabilities, and data at-rest encryption.

In accordance with an embodiment, object storage provides high throughput storage for unstructured data. Object storage service enables near limitless storage capacity for large amounts of analytic data, or rich content like images and videos. Block volumes can be backed up to object storage for added durability.

In accordance with an embodiment, local storage 178 can provide, for example, high speed and reliable storage in the form of solid state drives for I/O intensive applications. These can be provided, for example, within bare metal instances. Local storage provides high storage performance for VM's and bare metal compute instances. Some examples include relational databases, data warehousing, big data, analytics, AI and HPC application.

Figure 2:
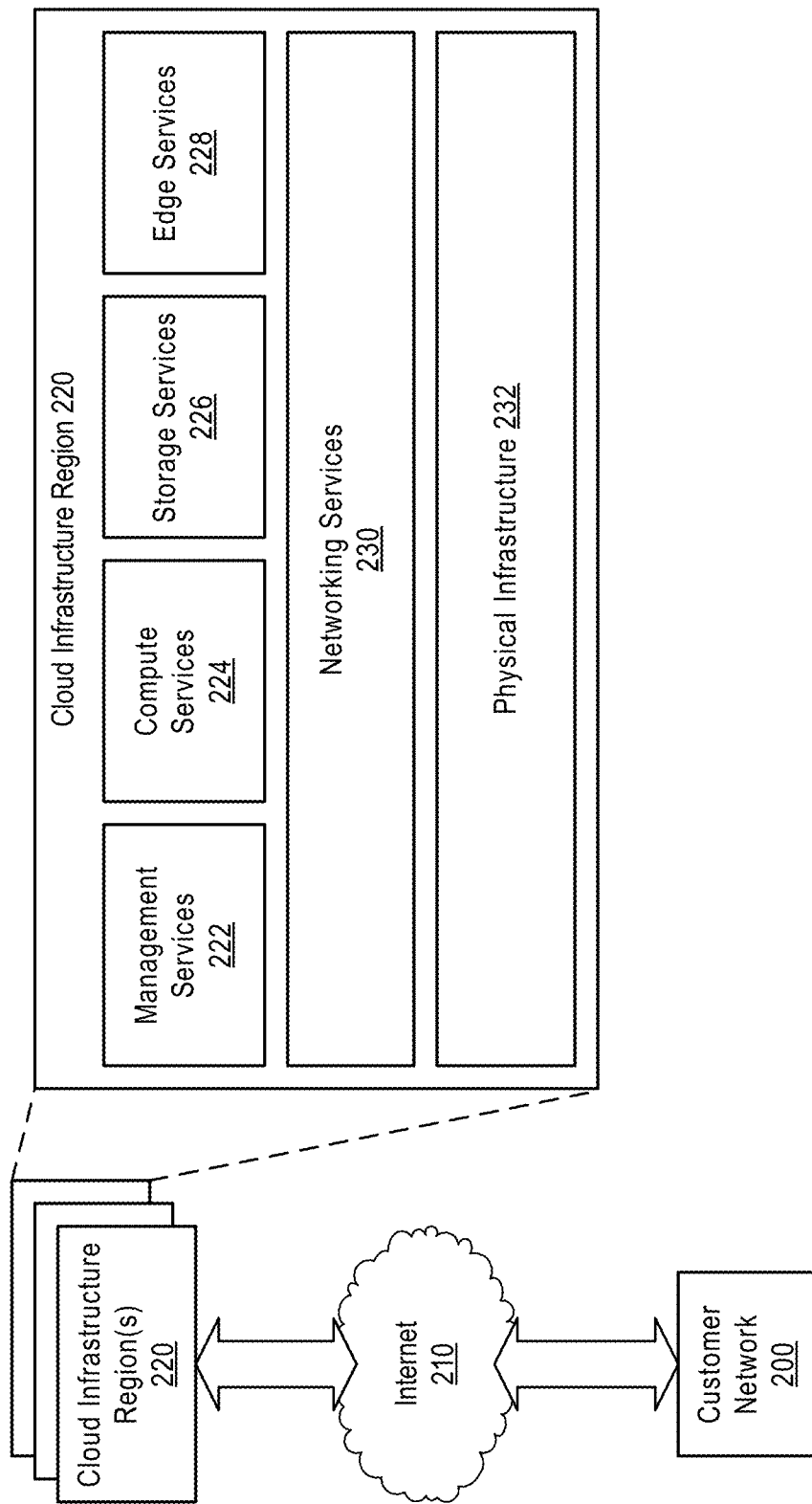
FIG. 2 illustrates a system for providing cloud infrastructure regions within a cloud infrastructure environment, in accordance with an embodiment.

FIG. 2 illustrates a system for providing cloud infrastructure regions within a cloud infrastructure environment, in accordance with an embodiment.

In accordance with an embodiment, instances of the cloud infrastructure environment described above in FIG. 1 can be hosted in different regions, called cloud infrastructure regions 220. These can be accessed, as described above, via a console, SDK, or APIs, by customer networks 200 via a network, such as the internet 210. Each cloud infrastructure region can comprise management services 222, compute services 224, storage services 226, edge serves 228, network services 230, and physical infrastructure 232.

In accordance with an embodiment, a cloud infrastructure can be hosted in regions and availability domains. A region can be a localized geographic area, and an availability domain can be one or more data centers located within a region. A region is composed of one or more availability domains. Most cloud infrastructure resources can be either region-specific, such as a virtual cloud network, or availability domain-specific, such as a compute instance. Traffic between availability domains and between regions is encrypted.

In accordance with an embodiment, availability domains are isolated from each other, fault tolerant, and very unlikely to fail simultaneously. Because availability domains do not share infrastructure such as power or cooling, or the internal availability domain network, a failure at one availability domain within a region is unlikely to impact the availability of the others within the same region.

In accordance with an embodiment, availability domains within the same region can be connected to each other by a low latency, high bandwidth network, which can provide high-availability connectivity to the internet and on-premises, and to build replicated systems in multiple availability domains for both high-availability and disaster recovery.

In accordance with an embodiment, regions are independent of other regions and can be separated geographically (e.g., across countries or continents). This then leads to the deployment of an application within a region where the application would most likely be utilized the most frequently.

In accordance with an embodiment, however, applications can also be deployed in different regions for various reasons. This can include, for example, risk mitigation when events, such as weather systems, take a region offline. In addition, applications can be deployed in other regions for strategic reasons, such as tax domains or other business or social criteria.

In accordance with an embodiment, there are several services that are available across regions. These include, for example, management services 222, compute services 224, storage services 226, edge services 228, and network services 230.

In accordance with an embodiment, compartments allow clients to organize and control access to cloud resources. A compartment is a collection of related resources (such as instances, virtual cloud networks, block volumes) that can be accessed only by certain groups that have been given permission by an administrator. For example, one compartment could contain all the servers and storage volumes that make up the production of a company's Human Resources (HR) system by way of example, and other compartments could each be separately dedicated to a company's legal, marketing, accounting, operations, and Information Technology (IT) systems by way of further example. In an example, only users with permission to that compartment can manage and/or access those servers and volumes. In a further example, the compartments could contain all the servers and storage volumes that make up the production of collections of a company's Human Resources (HR) system, and legal, marketing, accounting, operations, and Information Technology (IT) systems. In an example, only users with permission to portions of those resources can manage and/or access those portions on the servers and volumes.

The compartments of the example embodiments comprise one or more logical groups and are not necessarily a physical memory container, although they could be physical memory containers if desired or necessary. When working within a console, a compartment can act as a filter for what is allowed to be viewed. Compartments are a primary building block that can be used for cloud resources, and they can be used to organize and isolate resources to make it easier to manage and secure access to those resources.

In accordance with an embodiment, compartments can have several layers. For example, a tenancy can be considered a root compartment that holds all of a client's cloud resources. Additional compartments can be created within that root compartment (tenancy) and corresponding policies can be created to control access to the resources in each compartment. When clients create a cloud resource such as compute, storage, VCN, IP Address and/or DNS instances, block volume, or cloud network, such resources can be directed to a specific compartment or compartments. Compartments can span regions.

Fault Domains

In accordance with an embodiment, a fault domain can comprise a grouping of hardware and infrastructure within an availability domain. Each availability domain can comprise three fault domains. Fault domains allow instances to be distributed so that they are not on the same physical hardware within a single availability domain. A hardware failure or Compute hardware maintenance that affects one fault domain does not affect instances in other fault domains.

In accordance with an embodiment, placement of resources, such as compute, bare metal DB system, or virtual machine DB system instances, can optionally specify a fault domain or a new instance at launch time. The resources can additionally change fault domains after placement by terminating the resource at the current fault domain and launching a new instance of the resource at another fault domain.

In accordance with an embodiment, fault domains can be utilized for a number of reasons, such as protecting against unexpected hardware failures and protecting against planned outages due to maintenance.

Availability

In accordance with an embodiment, service availability can be provided. Regions within cloud infrastructure environments can provide core infrastructure services and resources, including the following:

Compute: Compute (Bare Metal & VM, DenseIO & Standard), Container Engine for Kubernetes, Registry Storage: Block Volume, File Storage, Object Storage, Archive Storage Networking: Virtual Cloud Network, Load Balancing, FastConnect Database: Database, Exadata Cloud Service, Autonomous Data Warehouse, Autonomous Transaction Processing Edge: DNS Platform: Identity and Access Management, Tagging, Audit In accordance with an embodiment, the above services and resources can be generally available, while other services and resources can additionally be available as well (e.g., based upon regional demand or customer request). As an example, new cloud services can be made available in regions as quickly based on a variety of considerations including regional customer demand, ability to achieve regulatory compliance where applicable, resource availability, and other factors. Because of low latency interconnect backbone, customers can use cloud services in other geographic regions with effective results when they are not available in their home region, provided that data residency requirements do not prevent them from doing so.

In accordance with an embodiment, resource availability can be considered in the context of global availability, regional availability, single region availability, and domain availability. Generally speaking, IAM resources are globally available, DB systems, instances, and volumes are specific to a viability domain. Most other resources are regional.

In accordance with an embodiment, examples of globally available resources can include API signing keys, compartments, dynamic groups, federation resources, groups, policies, tag namespaces, tag keys, and users.

In accordance with an embodiment, examples of regionally available resources can include, alarms, applications, buckets (although buckets are regional resources, they can be accessed from any location when the correct region-specific Object Storage URL for the API calls is used), clusters, cloud events-rules, customer-premises equipment (CPE), DHCP options sets, dynamic routing gateways (DRGs), encryption keys, functions, images, internet gateways, jobs, key vaults, load balancers, local peering gateways (LPGs), metrics, NAT gateways, network security groups, node pools, ons-subscriptions, ons-topics, repositories, reserved public Ips, route tables, security lists, service gateways, stacks, subnets (when a subnet is created, it can be declared to be a regional or specific to an availability domain), virtual cloud networks (VCNs), and volume backups (volume backups can be restored as new volumes to any availability domain within the same region in which they are stored).

In accordance with an embodiment, examples of availability domain-specific resources can include DB Systems, ephemeral public Ips, instances (instances can be attached to volumes in the same availability domain), subnets (when a subnet is created, it can be declared to be a regional or specific to an availability domain), and volumes (volumes can be attached to an instance in a same availability domain).

Compartments

In accordance with an embodiment, administrators can manage compartments within a cloud infrastructure environment.

In accordance with an embodiment, tags can be applied to resources within a compartment. Tags can be used to, for example, organize resources according a schema, such as a business needs schema. Tags can be applied to resources at the time of creation of a resource, or a tag can be updated on an existing resource. The tags associated with each of the resources may include for example resource tags 140*a* (FIG. 1) associated with the resources 140 in general, computer resource tags 150*a* associated with the computer resources 150, network resource tags 160*a* associated with the network resources 160, and storage resource tags 170*a* associated with the storage resources 170.

In accordance with an embodiment, compartments are important to the construction and organization of a cloud infrastructure. Resources can be moved between compartments, and resources can be displayed (e.g., via a user interface) organized by compartment within a current region. When working with and managing resources, a compartment can first be selected.

In accordance with an embodiment, compartments are tenancy-wide, and can span across regions. When a compartment is created, the compartment can be made available within every region that a tenancy is subscribed to.

In accordance with an embodiment, compartments can be deleted. In order for a compartment to be deleted, the compartment can have all resources therein removed prior to deletion.

In accordance with an embodiment, the action to delete a compartment can be asynchronous and initiates a work request. The state of the compartment changes to "Deleting" while the work request is executing. If the work request fails, the compartment is not deleted and it returns to the active state.

In accordance with an embodiment, each compartment created within the cloud infrastructure environment can have certain properties. For example, each compartment can be assigned a unique identifier (ID), and can additionally, and optionally, be provided with a modifiable description, as well as a name. In accordance with an embodiment, sub-compartments (or subcompartments) can be defined in a hierarchical manner under a base compartment.

In accordance with an embodiment, access and control over compartments and subcompartments can be limited to administrators or other users with sufficient credentials. Credentials can be associated with differing levels of compartment access. For example, an administrator can have permission to view and access all compartments and work with resources within any compartment of a tenancy, but a user with more limited access will not have such a level of access and control.

Figure 3:
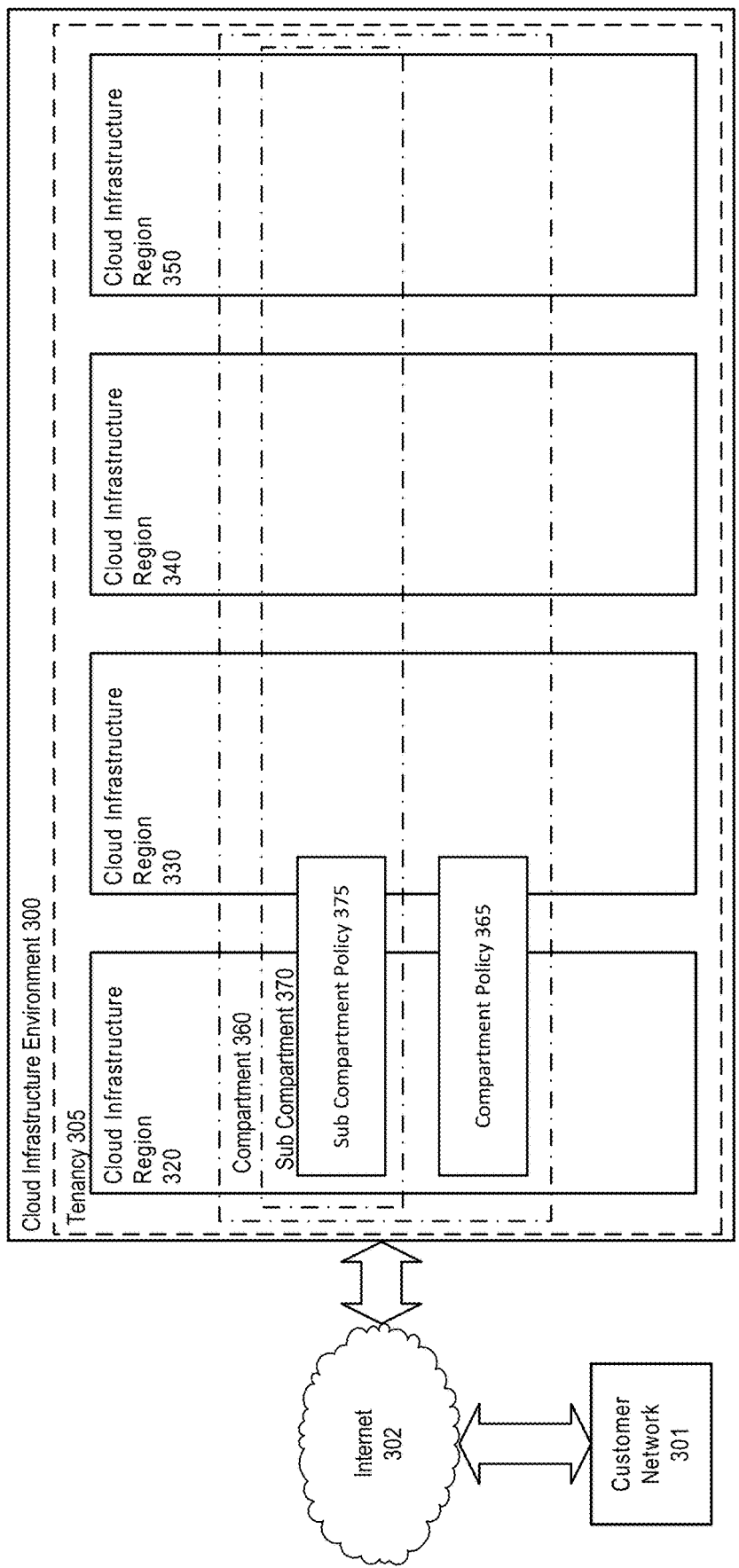
FIG. 3 shows a cloud infrastructure environment system illustrating relationships between compartments, compartment policies, sub-compartments, and sub-compartment policies for policy management and control spanning cloud infrastructure regions, in accordance with an embodiment.

FIG. 3 shows a cloud infrastructure environment 300 illustrating relationships between compartments 360, compartment policies 365, sub-compartments 370, and sub-compartment policies 375 for policy management and control spanning cloud infrastructure regions, in accordance with an embodiment.

In accordance with an embodiment, during, upon, or after creation of a compartment, or sub compartment, such as compartment 360 and sub compartment 370, a policy, such as compartment policy 365 and sub compartment policy 375 can be written/created for each compartment and sub compartment. Without a policy in place, access to the compartments and/or sub compartments can be restricted to users having permissions at the tenancy 305 level.

In accordance with an embodiment, upon creation of a compartment within a compartment (i.e., a sub compartment), the sub compartment inherits access permissions from compartments higher up its hierarchy.

In accordance with an embodiment, upon creation of a compartment or sub compartment policy, the policy can comprise a specification indicating which compartment the policy attaches to. Such a specification can contain controls limiting access for subsequence control, modification, or deletion of the policy. In some embodiments, the policies can be attached to a tenancy, a parent compartment, or the specific compartment to which the policy is directed.

In accordance with an embodiment, new resources can be placed into a compartment. This can be accomplished by specifying the targeted compartment upon creation of the new resource (the compartment is one of the required pieces of information to create a resource). This can be accomplished via a console interface.

In accordance with an embodiment, existing resources can also be moved to different compartments. Most resources can be moved after they are created. There are a few resources that you can't move from one compartment to another.

In accordance with an embodiment, some resources have attached resource dependencies and some do not. Not all attached dependencies behave the same way when the parent resource moves.

In accordance with an embodiment, for some resources, the attached dependencies move with the parent resource to the new compartment. The parent resource moves immediately, but in some cases attached dependencies move asynchronously and are not visible in the new compartment until the move is complete.

In accordance with an embodiment, for other resources, the attached resource dependencies do not move to the new compartment. Such attached resources can be moved independently.

In accordance with an embodiment, after a resource is moved to a new compartment, the policies that govern the new compartment apply immediately and affect access to the resource. Depending on the structure of the compartment organization, metering, billing, and alarms can also be affected.

In accordance with an embodiment, after creation, a compartment can be moved to, e.g., a different parent compartment within a same tenancy. Upon moving a compartment, all of the compartment's contents (including sub compartments and resources) are moved along with the compartment.

Figure 4:
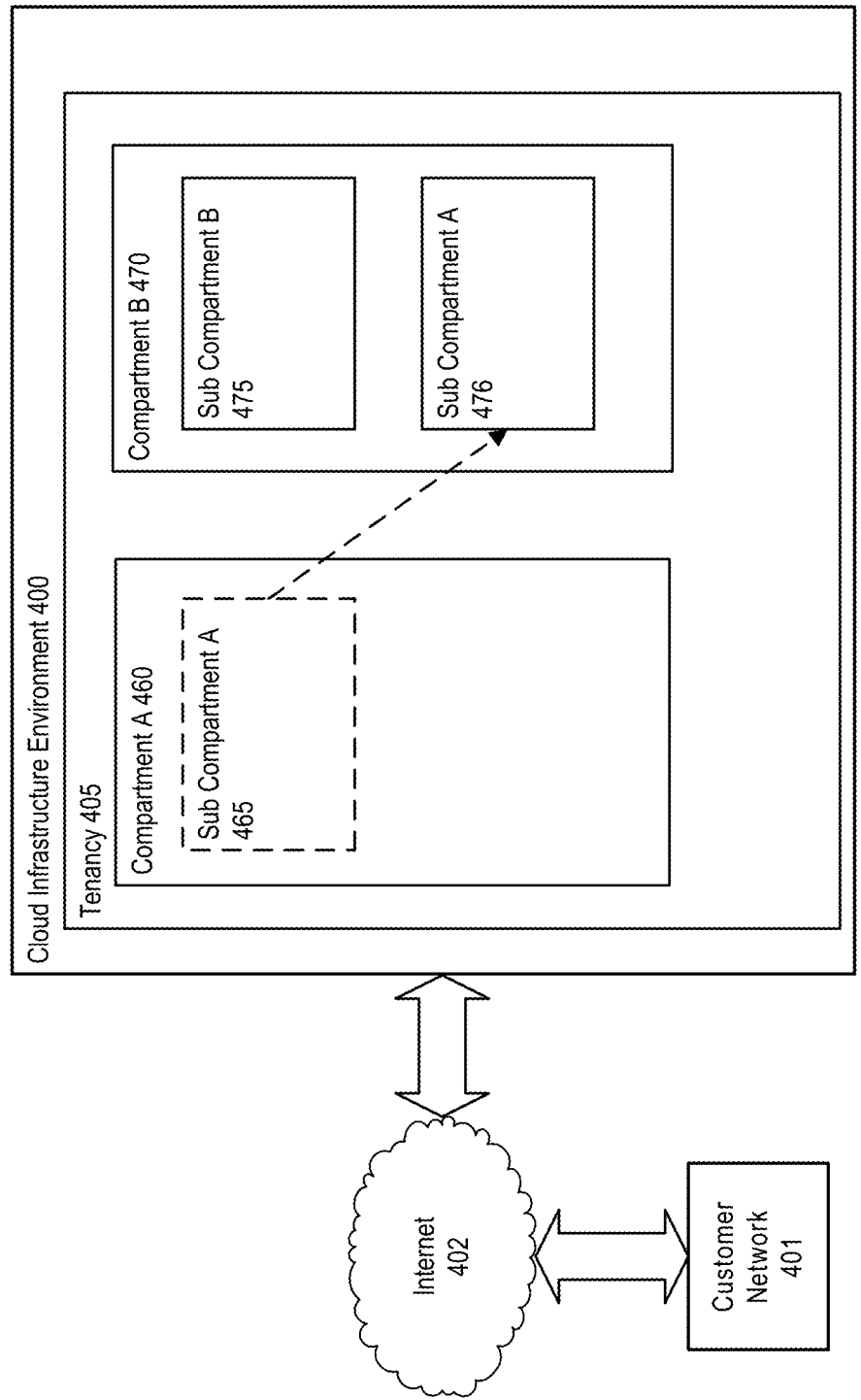
FIG. 4 shows a cloud infrastructure environment illustrating relationships between compartments, compartment policies, sub-compartments, and sub-compartment policies when compartments are moved.

FIG. 4 illustrates a system for compartment migration within a cloud infrastructure environment, in accordance with an embodiment.

In accordance with an embodiment, as described above, instances of the cloud infrastructure environment 400 described above in FIG. 1 can be hosted in different regions. Compartments, such as tenancy 405, compartment A 460 and compartment B 470, can be defined within the cloud infrastructure environment, and these compartments can span across regions. Such compartments can be accessed, as described above, via a console, SDK, or APIs, by customer networks 401 via a network 402, such as the internet.

In accordance with an embodiment, a customer network 401 can comprise, for example, a single computer, a network of customer computers, or other such networks.

In accordance with an embodiment, compartments allow clients to organize and control access to cloud resources. A compartment is a collection of related resources (such as instances, virtual cloud networks, block volumes) that can be accessed only by certain groups that have been given permission by an administrator. A compartment can be thought of as a logical group and not a physical container. When working within a console, a compartment can act as a filter for what is allowed to be viewed.

In accordance with an embodiment, compartments can have several layers. For example, a tenancy 405 can be considered a root compartment that holds all of a client's cloud resources. Compartments can be organized in a hierarchical manner, such as compartment A 460 and compartment B 470 being a level below the tenancy compartment, with sub compartment A 465 being defined below compartment A, and sub compartment B 475 being defined below compartment B. In accordance with an embodiment, each compartment can be associated with one or more compartment policies (not shown).

In accordance with an embodiment, compartments defined within a tenancy, for example, can be moved by, for example, re-defining a compartment or sub-compartment.

In accordance with an embodiment, in order to move a compartment, a request with sufficient permissions can be received. That is, a request from a user belonging to a group that has, for example, a "manage all-resources" permissions on the lowest shared parent compartment to the current compartment and the destination compartment of the moving compartment.

That is, for example, a request to move sub-compartment A 465 from compartment A 460 to compartment B 470 must be received from a user with sufficient permissions. Because the tenancy 405 is the lowest shared parent compartment of both the source compartment, compartment A 460, and the destination compartment, compartment B 470, then the request to move sub-compartment A, as shown in the Figure, must be received from a user having "manage all-resources" permissions within the tenancy 405 compartment.

In accordance with an embodiment, in another example, if the request to move sub-compartment A 465 from compartment A to compartment B was received from a user having "manage all-resources" permissions within compartment A only, then the request may fail as the request from the user cannot manage resources within the destination compartment, namely compartment B.

In accordance with an embodiment, upon moving a compartment to a new parent compartment, the access policies of the new parent take effect and the policies of the previous parent compartment no longer apply. In some cases, when moving nested compartments with policies that specify the hierarchy, the polices can be automatically updated to ensure consistency.

In accordance with an embodiment, therefore, a compartment policy of compartment A 460 which was previously applied to sub-compartment A would no longer apply on migration of the sub-compartment A to compartment B.

Then, a compartment policy of compartment B would apply to sub-compartment A instead. This is explained more in the description following Figure.

Figure 5:
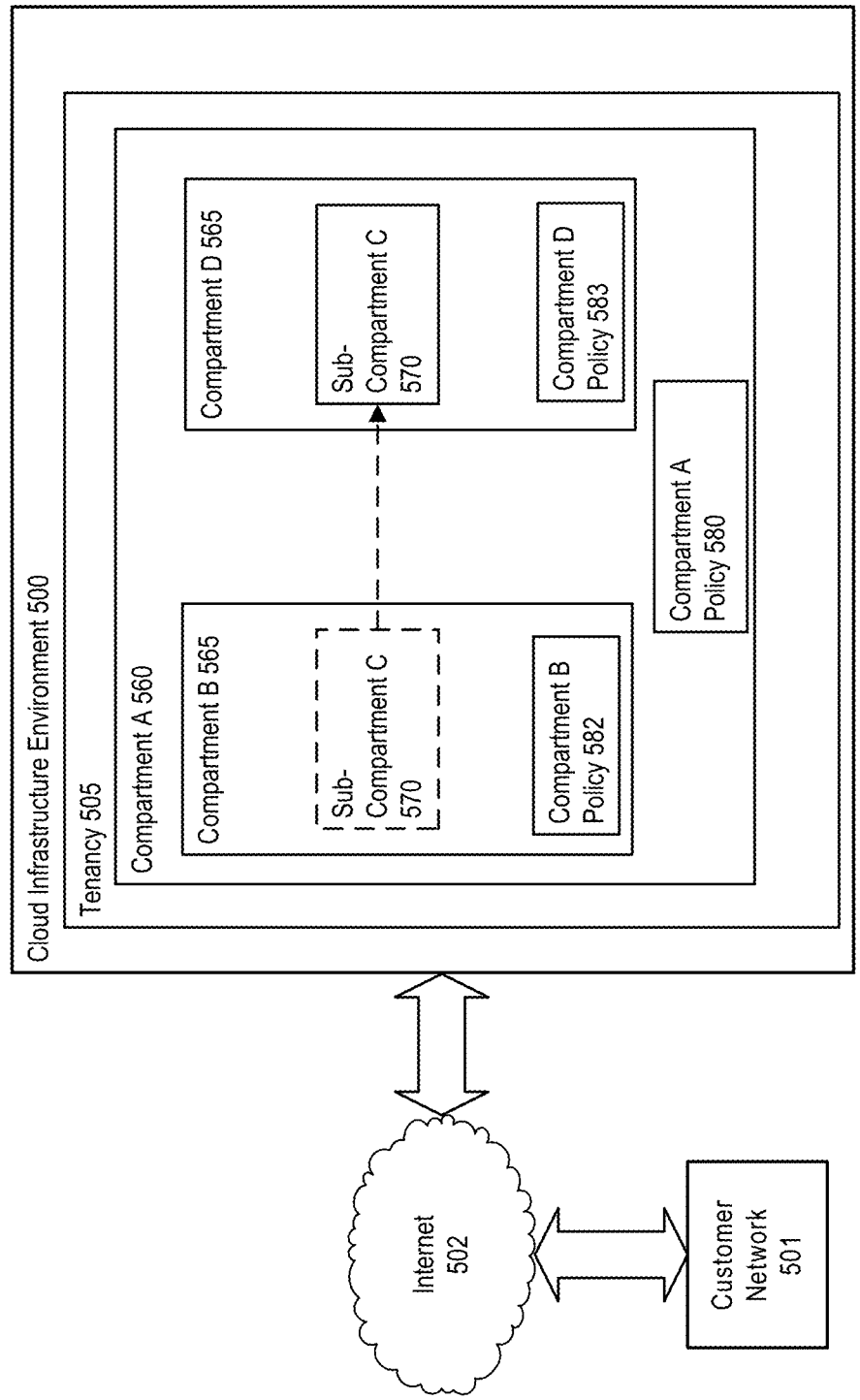
FIG. 5 shows a cloud infrastructure environment illustrating implication of policies when moving compartments.

FIG. 5 shows a system for policy management and enforcement during compartment migration within a cloud infrastructure environment.

In accordance with an embodiment, and more specifically, FIG. 5 shows a compartment hierarchy in which a compartment is moved, and the consequences for different policies.

In accordance with an embodiment, as described above, instances of the cloud infrastructure environment 500 described above in FIG. 1 can be hosted in different regions. Compartments, such as tenancy 505, compartment A 560 and compartment B 565, and compartment D 566 can be defined within the cloud infrastructure environment, and these compartments can span across regions. Such compartments can be accessed, as described above, via a console, SDK, or APIs, by customer networks 501 via a network 502, such as the internet.

In accordance with an embodiment, a customer network 501 can comprise, for example, a single computer, a network of customer computers, or other such networks.

In accordance with an embodiment, compartments can have several layers. For example, a tenancy 505 can be considered a root compartment that holds all of a client's cloud resources. Compartments can be organized in a hierarchical manner, such as compartment A 560 being a level below the tenancy. Compartments B 565 and compartment D 566 are then organized as being yet another level below compartment A 560, while sub-compartment C 570 is shown as being originally a level below compartment B. In accordance with an embodiment, each compartment can be associated with one or more compartment policies, such as compartment B policy 582, compartment A policy 580, and compartment D policy 583. Such policies can govern, for example, user/client permissions for access to the compartments, as well as permissions for access to and control of resources within any given compartment. As described above, compartment policies can add to each other (i.e., "stack"), such that a user accessing compartment B 565 would have their interactions with compartment B 565 being governed by/limited by compartment B policy 582 in addition to compartment A policy 580.

In accordance with an embodiment, for example, suppose that compartment B policy 582 allows a group, group 1, to manage the instance-family in compartment A-B (the compartment hierarchy comprising compartment B being a sub compartment of compartment A).

In accordance with an embodiment, suppose also that compartment D policy 583 allows another group, group 2, to manage the instance family in compartment A-D (the compartment hierarchy comprising compartment D being a sub compartment of compartment A).

In accordance with an embodiment, upon compartment C being moved from compartment B to compartment D, members of group 1 can no longer manage instance families in compartment C, while members of group 2 can now manage instance families in compartment C.

In accordance with an embodiment, in certain situations, upon moving a compartment, certain policies can be automatically updated. Policies, for example, that specify the compartment hierarchy down to the compartment being moved can be automatically be updated when the policy is attached to a shared ancestor of the current and target parent.

Referring back to FIG. 5, for example, in accordance with an embodiment, suppose that compartment A policy allows members of a group, group X, to manage buckets in compartment B:C. On moving compartment C to compartment D, because of the shared ancestor (compartment A) between compartments B and D, then the compartment A policy can be automatically updated to allow members of group X to manage buckets in compartment D:C.

In accordance with an embodiment, polices attached to tenancies can be likewise automatically updated upon a compartment moving within the tenancy.

In accordance with an embodiment, however, not all policies are automatically updated upon a compartment moving. For example, in referring to FIG. 5, in the situation where compartment C is moved from compartment B to compartment D. Suppose that the compartment B policy allows management of buckets in compartment C (prior to moving). When compartment C is moved, then, compartment B policy is not automatically updated. Instead, the policy is no longer valid and can be removed (e.g., manually or automatically).

Tag Based Resource Limits/Quotas

In accordance with an embodiment, cloud administrators do not generally have the ability to restrict resource usage in existing clouds. Granting a user permission to create resources allows them to create any number of resources up to a predefined account limit. Tag based resource limits or quotas allow restrictions to be placed on the ability to create or use resources within a compartment to the appropriate level allowing fine-tuned cost control.

In accordance with an embodiment, customers can be assigned service level limits defined by the cloud infrastructure environment at account creation time. These service level limits restrict the total number of resources a customer can create across the entire tenancy (e.g., across multiple regions with multiple compartments). Tenancy and compartment administrators can utilize tag based resource limits or quotas to set resource-specific hard limits. Without such compartment limits on individual resources, a user that is authorized to launch instances can consume all available capacity in the entire tenancy. Tag based resource limits or quotas solve this problem and, unlike service limits, are set and customized by the clients and customers via, e.g., a console, SDK, or API. Tag based resource limits or quotas can be applied on top of the service limits and inherited through the nested compartment hierarchy. This allows cloud administrators to limit resource consumption and set boundaries around acceptable resource use.

In accordance with an embodiment, tag based resource limits or quotas give tenant and compartment administrators better control over how resources are consumed in a cloud infrastructure environment, enabling administrators to easily allocate resources to users or to groups of users by means of, for example, a console, SDK, or API. Compartment quotas are a powerful toolset to manage client spending in within tenancies.

In accordance with an embodiment, when a client has resources (for example, instances, VCNs, load balancers, and block volumes) across multiple compartments in their tenancy, it can become difficult to track resources used for specific purposes, or to aggregate them, report on them, or take bulk actions on them. Tagging allows clients to define keys and values and associate them with resources. Tags can be used to assist in organizing and listing resources. There are, in general, two types of tags: free-form tags and defined tags, although other types of tags are also possible in accordance with the example embodiments.

In accordance with an embodiment, free-form tags can consist of a key and a value. For example, "environment: production" is an example of a free-form tag, where "environment" is the key, and "production" is the value. Multiple free-form tags can be applied to a single resource.

In accordance with an embodiment, defined tags provide more features and control than free-form tags. Before clients create a defined tag key, a tag namespace can be set up for the defined tags. The namespace can be thought of as a container for a set of tag keys. Defined tags support policy to allow control over who can apply your defined tags. The tag namespace is an entity to which clients can apply policy.

In accordance with an embodiment, to apply a defined tag to a resource, a user can first select the tag namespace, then the tag key within the namespace, and then the user can assign the value. Administrators can control which groups of users are allowed to use each namespace. In accordance with an example embodiment, the tags may be applied to the resources as they are created. In another embodiment, the tags may be applied to resources after they are provisioned, thereby allowing for retroactive enforcement of resource quotas or limits in systems using the tags. In accordance with an embodiment, the tags may be used to enable cost governance and/or resource governance. In that way, the tags may be used to track costs.

Service Limit Increase for Multi-Tenant Cloud Infrastructure Environment

In accordance with an embodiment, each tenancy within a cloud infrastructure environment can be associated with or assigned a set of service limits are configured for each tenancy. The service limit can comprise the quota or allowance set on a resource. For example, a tenancy can be allowed a maximum number of compute instances per availability domain. These limits can generally established upon tenancy creation and can vary from one tenant to another. Such variance can be based upon, for example, different levels of service or subscription in the cloud infrastructure environment.

In accordance with an embodiment, when a tenant reaches a service limit for a resource, an error can result when the tenant requests further use of, or creation of another resource of that type associated with a specific service limit. Upon such an error, a tenant can generally be prompted to submit a request to increase the limit. Generally speaking, a new resource cannot be created until a service limit has been increased (e.g., a tenant request for a service limit increase has been granted), or the tenant terminates an existing resource of the same type. Service limits can apply to a specific scope, and when the service limit in one scope is reached, a tenant may still have resources available in other scopes (for example, in other availability domains).

In accordance with an example embodiment, systems and methods are provided for user-transparent automatic service limit adjustment, wherein contractual or other service limits placed on resource use and/or provisioning allocated to tenants of a cloud infrastructure environment are automatically adjusted based on a set of rules applied to tenant cloud accounts before customers of the tenants may have a need to request additional resources and/or before the service limits allocated to the tenants are reached. In that way, beneficially, users of selected tenants such as for example users of trusted tenants may easily and efficiently provision or otherwise use resources without the disruption associated with supervisory manual review and approval of the resource requests when the tenant is at or near to the contractual or other service limits placed on the resources.

In accordance with an example embodiment, the tenants of the multi-tenant cloud infrastructure environment may opt out of the user-transparent automatic service limit adjustment system and method so that service limit increases may be established in other ways.

In accordance with another example embodiment, systems and methods are provided for user-directed automatic service limit adjustment, wherein requests from users of selected tenants such as for example users of trusted tenants to increase contractual or other service limits placed on resource use and/or provisioning allocated to tenants of a cloud infrastructure environment are automatically granted to the requesting user. In that way, beneficially, users of trusted or other tenants may easily and efficiently provision or otherwise use resources by simply requesting an increase and without the disruption associated with supervisory manual review and approval of the resource requests when the tenant is at or near to the contractual or other service limits placed on the resources.

Figure 6:
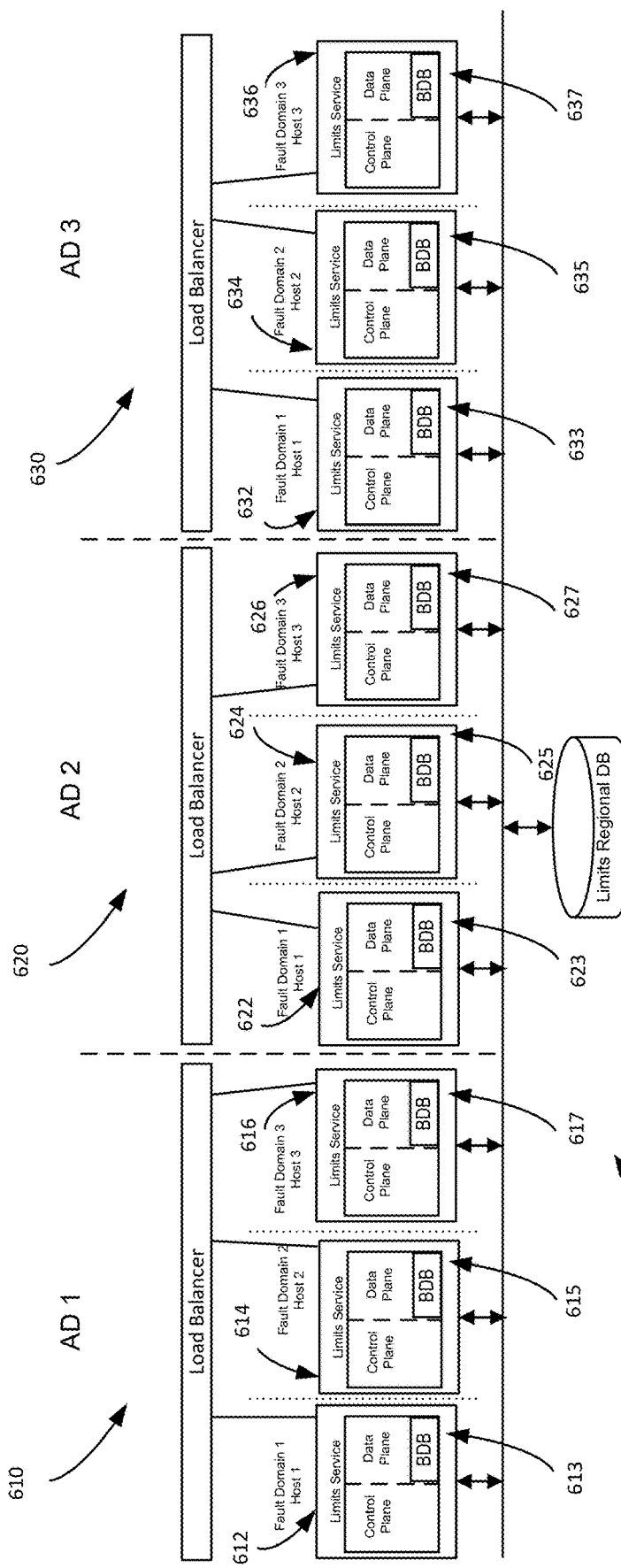
FIG. 6 shows a system for supporting service limits, in accordance with an embodiment.

FIG. 6 shows a system 600 for supporting service limits, in accordance with an embodiment.

In accordance with an embodiment, a limits service can comprise a master-slave system where the master region is located one region, while other regions can operate in slave mode. Data can be equally replicated across all regions.

In accordance with an embodiment, each region can comprise a regional database (such as a pluggable database, or a Kiev database) where all data is being stored. Each region can comprise a number of availability domains, such as availability domain (AD) 1 610, AD 2 620, and AD 3 630. Each of the availability domains can have a number of hosts (e.g., within fault domains). In the depicted embodiment, each AD comprises 3 hosts, which are distributed across fault domains.). In the depicted embodiment, the first availability domain 610 includes three (3) hosts 612, 614, and 616. In addition and as shown, the second availability domain 620 includes three (3) hosts 622, 624, and 626, and the third availability domain 630 includes three (3) hosts 632, 634, and 636.

In accordance with an embodiment, each host runs one or more instances of a Limits Service 613, 615, 617, 623, 625, 627, 633, 635, and 637 which run in the control plane (CP) and the data plane (DP) at the same time. The two sets of limit services can coexist in the same service application within the host.

Figure 7:
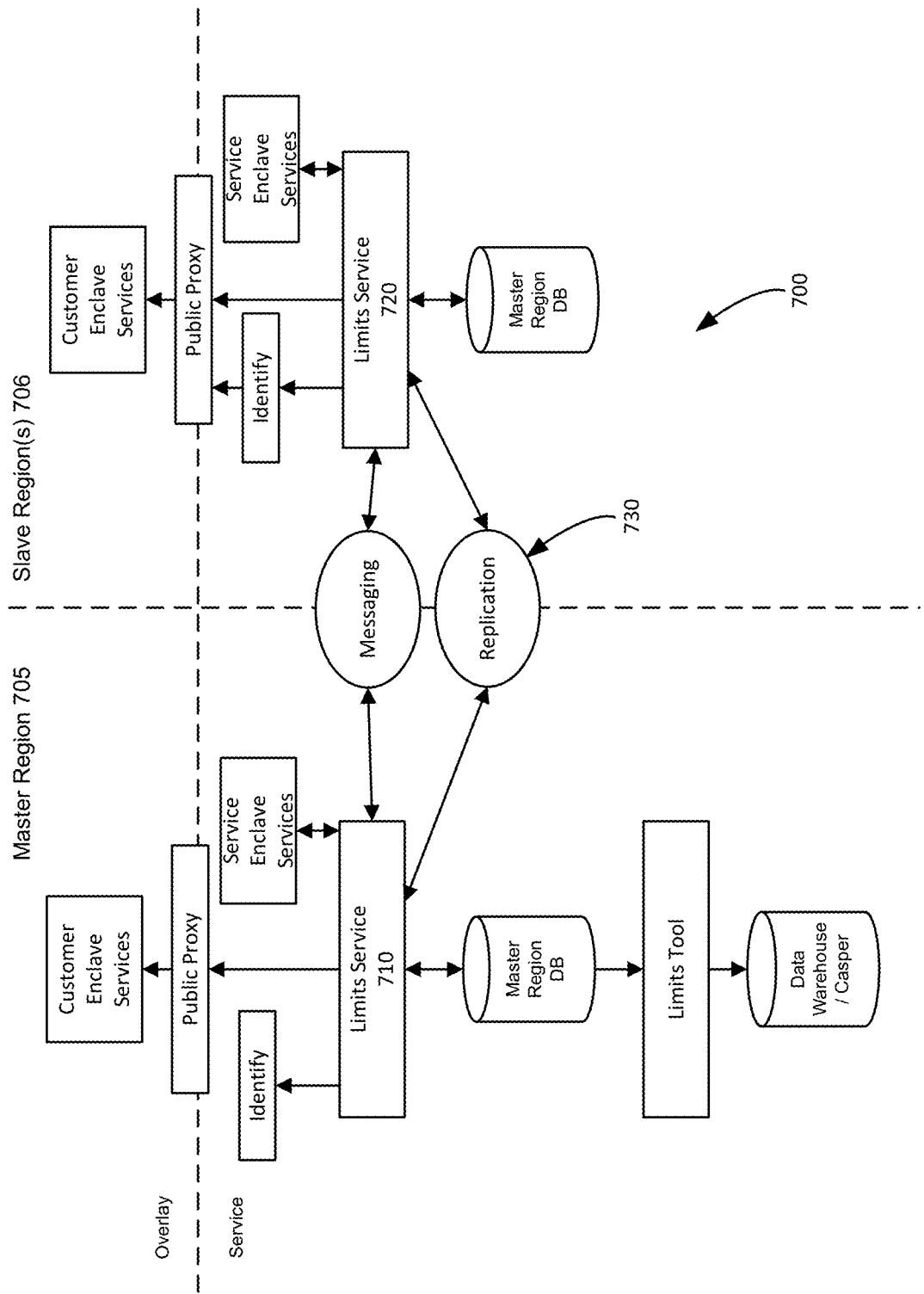
FIG. 7 shows a system for supporting service limits, in accordance with an embodiment.

FIG. 7 shows a system 700 for supporting service limits, in accordance with an embodiment.

In accordance with an embodiment, the limit services 710, 720 are regional services and limit values can be replicated 730 across all regions. In the embodiment depicted in FIG. 7, the limit service 710 of master region 705 can be replicated 730 to a limit service 720 of one or more slave regions 706.

In accordance with an embodiment, a cloud provider can utilize a limit service 710, 720 to protect themselves from capacity shortages, preventing unforeseen spikes by creating service limits on number of resources that a customer/tenant can create. If a customer wants to create more cloud resources after limit has reached, generally the customer has to request for limit increase and which can potentially take few days as most of the time these requests are manually reviewed and approved. There are several problems and disadvantages with such an approach, including:

Cloud customers has to wait for increasing their limits after a request. On an average, approval can take two and a half days.

Cloud platform providers have to spend lot of time and resources in evaluating, and approving each limit increase requests.

Manual approval and limit change processes are always error prone. The operations teams may assign more limits by mistake or by missing some of the verification processes even if the location does not have sufficient resources.

There is no easy way for the customer to track the life cycle state of the limit increase request that customer has sent.

In accordance with an embodiment, the systems and methods described herein generally relate to automatic management as well as simplified self-service management of cloud platform service limits. Automatic limit increase can allow customers to create cloud resources without manual intervention. For customers who opt out for automatic limit increase, such customers can increase service limits using a self-service limit increase with automatic approval. For some scenarios, such as increasing the limits for more expensive resources require more communication with the customer and sometimes the billing contract may have to change. The systems and methods can automate the complete life cycle of this limit increase request, and after the limit has increased, the system can notify the customer.

In accordance with an embodiment, the systems and methods described herein can provide for automatic limit increase using a background process. A background process can periodically enumerate all the tenancies that are consuming cloud resources, as well as signal or notify when and if a tenant reaches a threshold limit value. In such situations, the background process can automatically increase service limits based on, for example, certain rules. Such rules can comprise a "Cloud account history" and "Cloud account score".

In accordance with an embodiment, the systems and methods described herein can additionally provide a self-service limit increase with automatic approval. Instead of manually reviewing and approving a request for a service limit increase, the system can review the limit increase request and approve the request if it satisfies the all the rules defined by the system. Such rules can comprise a "Cloud account history" and "Cloud account score".

In accordance with an embodiment, the process can utilize a number of data points to determine a client's cloud account history and cloud account score, which are utilized in both the automatic limit increase using the background service, as well as in the self-service limit increase with automatic approval processes described above. Such data points include, but are not limited to:

Tenancy resource usage information from past X days.
Tenancy payment history and commitment history for past X months.
Age of the customer cloud account.
Type of the customer account (Enterprise, Default, internal etc.).
Tenancy status (Active or Suspended).
Number of limit increase requests made by the customer.

In accordance with an embodiment, the systems and methods herein can utilize the following data points in conjunction with a client's cloud account history and cloud account score to make the automatic decision to increase a service limit, or in automatically approving a self-service limit service increase request.

Type of resource that the limit is applicable to (Billable, Non-billable, Expensive, Free-Tier etc.).
Location of the customer.
Safe limit and Hard limit values for that resource.
Pattern for limit increase requests.
Fraud detection using machine learning and rules based engine.
Use machine learning to analyze the limit increase requests from past time period (e.g., one year) for the specific resource.

In accordance with an embodiment, for requests that are not able to be automatically approved, a service request can be created. The service request will be handled by an operational engineer and operational engineer may communicate with customer to get more data before approving the request.

Self-Service Automatic Limit Increase Request

In accordance with an embodiment, a method can be used to approve a self-service automatic limit increase request.

In accordance with an embodiment, a cloud provider can use service limits to prevent the following issues:

To prevent cloud provider from fraud customers.
To prevent customer from runaway scripts.
To protect cloud provider from capacity shortage (Any single customer consuming an outsized number of cloud resources).

In accordance with an embodiment, a self-service automatic limit increase request can help prevent such issues.

In accordance with an embodiment, the systems and methods can provide automatic approval for a limit increase within safe limits. If a tenancy is an enterprise tenant and limit increase request is within enterprise safe limits the request can be auto approved. If the tenancy is a PAYG (pay as you go) tenant and limit increase request is within PAYG safe limits the request can be auto approved.

In accordance with an embodiment, the systems and methods can utilize a method such as the below to determine if a limit increase request beyond a safe limit should be approved or not. The tenants can be divided into a number of levels (e.g., "High", "Mid", "Low") based upon, e.g., each tenant's commitment amount.

In accordance with an embodiment, then, the systems and methods can compute new limit value based on the commitment amount and already used amount by the requesting tenant. As an example, suppose a tenant has a certain commitment per month of $100,000.0. The extended commitment amount per month is 100k+10k=110k $ (Assuming the p90 overage value for existing customers is 10% more than the commitment amount). Also, the tenant has a used commitment amount per month=$95k. A single core cost (or single resource cost) per month=$200 Allowed Limit increase value=(110k−95k)/200=75.

$$NewLimitValue1 = CurrentLimitValue + Allowed\ Limit\ increase\ value = 100+75=175.$$

In accordance with an embodiment, then, the systems and methods can compute a 50% more than the current usage value. For example, if a current UsageValue=100, then a new limit value can be 50% more, or 150.

In accordance with an embodiment, then, depending on the resources approved, the limit requests which can be a configurable distance away from an average. For example, the limit request can be four standard deviations of the mean, or which are less than p90 limit increase request data for that resource. The systems and methods can compute the P90 limit increase request value for that resource in the given template. For example, assuming P90 limit increase value for the given limit is 60, the NewLimitValue3=CurrentLimitValue+60=160.

In accordance with an embodiment, assuming 95% of the distribution lies within four standard deviations of the mean, the systems and method scan automatically approve any limit value within four standard deviations of the mean.

In accordance with an embodiment, in statistics, the 68-95-99.7 rule, also known as the empirical rule, is a shorthand used to remember the percentage of values that lie within a band around the mean in a normal distribution with a width of two, four and six standard deviations, respectively; more accurately, 68.27%, 95.45% and 99.73% of the values lie within one, two and three standard deviations of the mean, respectively.

In accordance with an embodiment, the systems and methods can then check if there is any hard limit value exist for the resource. For example, if a NewLimitValue4=HardLimitValue, then the systems and methods can approve the auto limit increase request if the new limit value is less than or equal to:

Math.Min(NewLimitValue1,NewLimitValue2,NewLimitValue3,NewLimitValue4).

In accordance with an embodiment, the systems and methods can also include a number of checks prior to auto approval for limit increase. The systems and methods can allow to increase limits only for whitelisted set of limits. As another example, if the number of limit increase requests from past one month is greater than a configured number (e.g., 5) then a new auto increase request can be rejected.

In accordance with an embodiment, the systems and methods can be configured to disallow auto limit increases during certain time periods (e.g., during the last month of a customer's subscription). As well, the systems and methods can disallow automatic limit increase for blocked listed tenants. This is easy way to block fraud customer in unexpected scenarios.

Figure 8:
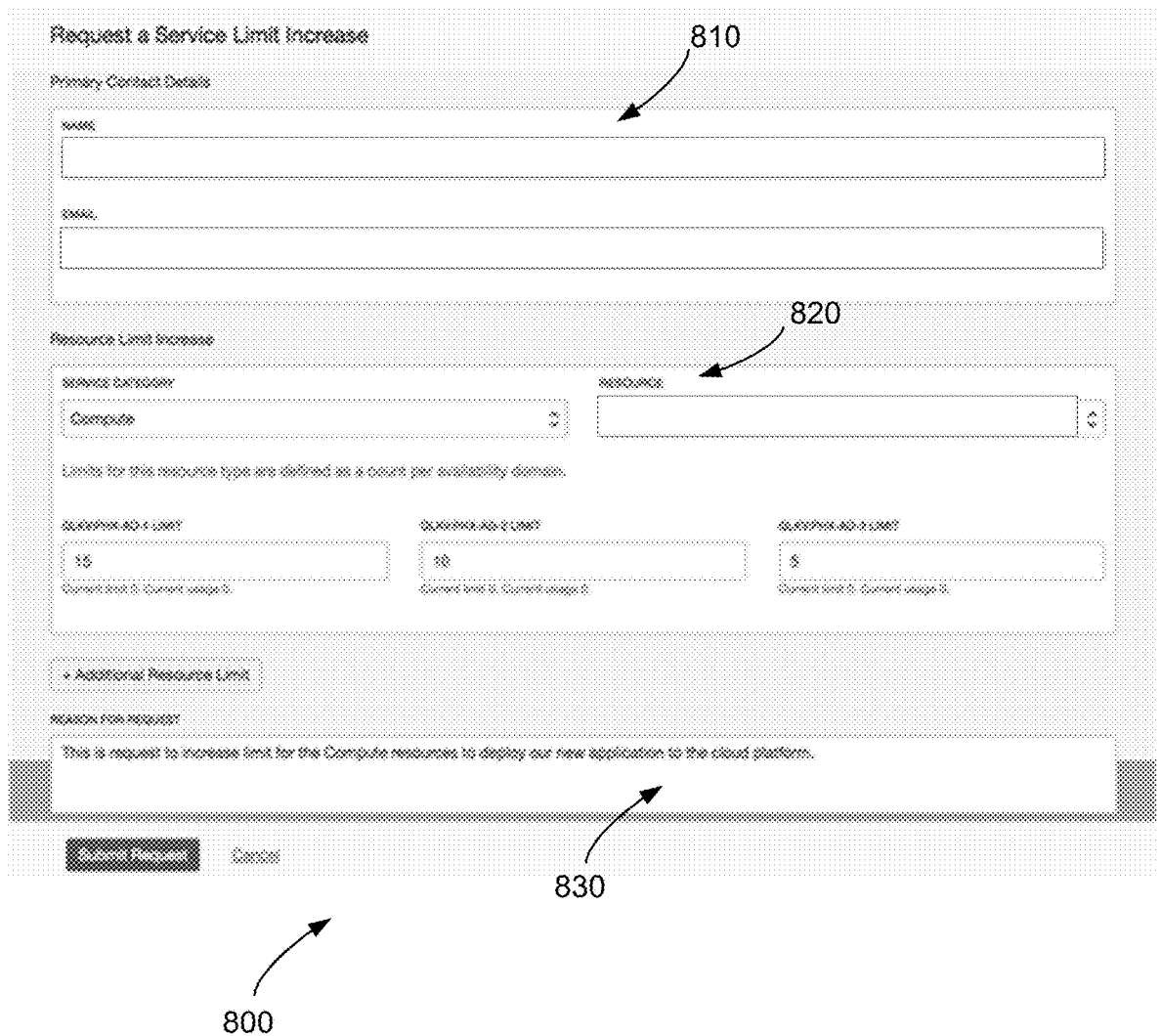
FIG. 8 shows an exemplary user interface for an automatic limit service increase request, in accordance with an embodiment.

FIG. 8 shows an exemplary user interface 800 for an automatic limit service increase request, in accordance with an embodiment. The user may enter user-particular information in a Primary Contact Details pane 810 and the user may query the system for resource allocation in the Resource Limit Increase dialog box 820. A Reasons dialog box 830 is further provided for the tenant user to add information that may be needed for permitting or denying the automatic limit increase. In accordance with an example embodiment, upon finding that a particular requested increase to a limit associated with a cloud resource is greater than or equal to a set of maximal limits, the limit service may disapproving the request, notifying a user of the tenant requesting the increase that the request was disapproved, and generate an exception service operable to couple the user of the tenant requesting the increase with an operational engineer for communicating additional information between the user and the operational engineer such as by using the dialog box 830 for example for further re-requesting the increase in service based on the additional information communicated between the user and the operational engineer.

Figure 9:
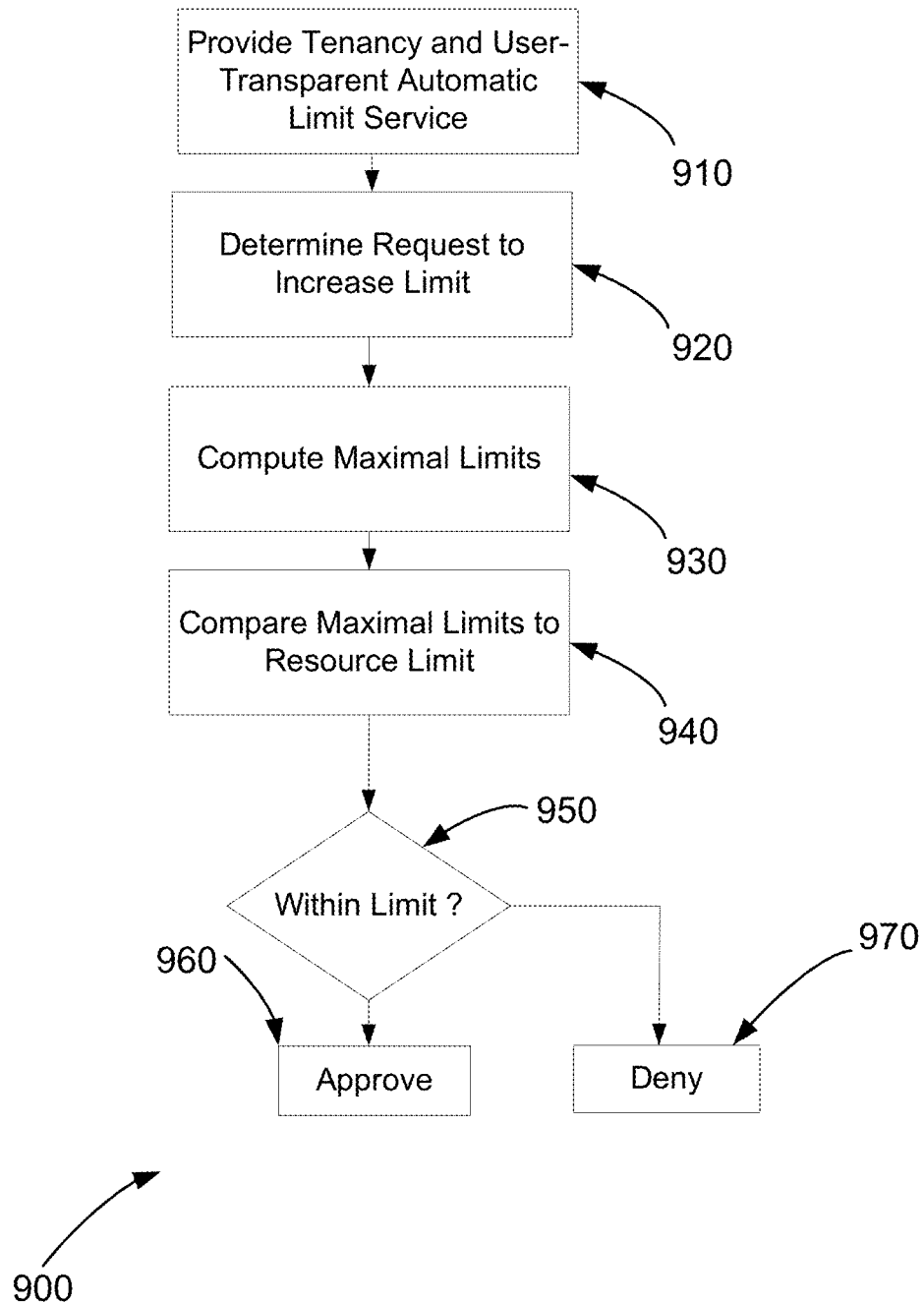
FIG. 9 is a flow diagram showing a method for user-transparent automatic service limit adjustment in a multi-tenant environment in accordance with an example embodiment.

FIG. 9 is a flow diagram showing a method 900 for user-transparent automatic service limit adjustment in a multitenant environment including a plurality of regions in accordance with an example embodiment. A computer comprising one or more microprocessors is provided defining a tenancy within the plurality of regions of the associated cloud infrastructure environment, together with providing a limit service in step 910 automatically increasing a service limit in the tenancy. In the example embodiment, the limit service includes a plurality of limits associated with one or more cloud resources. The limit service determines in step 920 a request to increase a limit associated with a cloud resource of the one or more cloud resources, wherein the request is associated with a first tenant of the plurality of tenants.

The limit service computes in step 930 a set of maximal limits associated with the first tenant, and compares the requested increase with the limit associated with the cloud resource in step 940.

Upon finding in step 950 that the requested increase to the limit associated with the cloud resource to be less than each of the set of maximal limits, the limit service selectively approves the request in step 960. The request is denied in step 970 upon finding in step 950 that the requested increase to the limit associated with the cloud resource is greater than or equal to any of the set of maximal limits.

The determining the request to increase the limit associated with the cloud resource request includes in the example embodiment automatically generating by the limit service the request to increase the limit associated with the cloud resource of the one or more cloud resources based upon the tenant's usage of the cloud resource.

The automatically generating the request to increase the limit associated with the cloud resource includes in the example embodiment automatically generating by the limit service the request to increase the limit without input to the limit service from the tenant.

In accordance with an example embodiment and as shown in FIG. 9, systems and methods are provided for user-transparent automatic service limit adjustment, wherein contractual or other service limits placed on resource use and/or provisioning allocated to tenants of a cloud infrastructure environment are automatically adjusted based on a set of rules applied to tenant cloud accounts before customers of the tenants may have a need to request additional resources and/or before the service limits allocated to the tenants are reached. In that way, beneficially, users of selected tenants such as for example users of trusted tenants may easily and efficiently provision or otherwise use resources without the disruption associated with supervisory manual review and approval of the resource requests when the tenant is at or near to the contractual or other service limits placed on the resources.

The computing includes in the example embodiment computing by the limit service each maximal limit of the set of maximal limits associated with the first tenant upon at least one of a current usage of the tenant, a hard maximum of the cloud resource, a percentage increase of the tenant, and an average of the tenant usage. In accordance with an embodiment, the systems and methods described herein provide a self-service limit increase with automatic approval. Instead of manually reviewing and approving a request for a service limit increase, the system can review the limit increase request and approve the request if it satisfies the all the rules defined by the system. Such rules can comprise the "Cloud account history" and the "Cloud account score" described above.

In accordance with an example embodiment, the method may include selectively receiving an opt out request by the limit service from the tenant. Upon receiving the opt out request from the tenant, the limit service determines the request to increase the limit based upon a received instruction from the tenant requesting the increase as will be described in greater detail below and with reference to FIG. 10. Based on not receiving the opt out request from the tenant, the limit service automatically generates the request to increase the limit associated with the cloud resource of the one or more cloud resources.

The method further includes, upon finding that the requested increase to the limit associated with the cloud resource to be greater than or equal to any of said set of maximal limits the limit service, the limit service disapproves the request in step 970, and may notify a user of the tenant requesting the increase that the request was disapproved such as described above with reference to FIG. 8, for example. The limit service may generate an exception service operable to couple the user of the tenant requesting the increase with an operational engineer for communicating additional information between the user and the operational engineer for further re-requesting the increase in service based on the additional information communicated between the user and the operational engineer.

Figure 10:
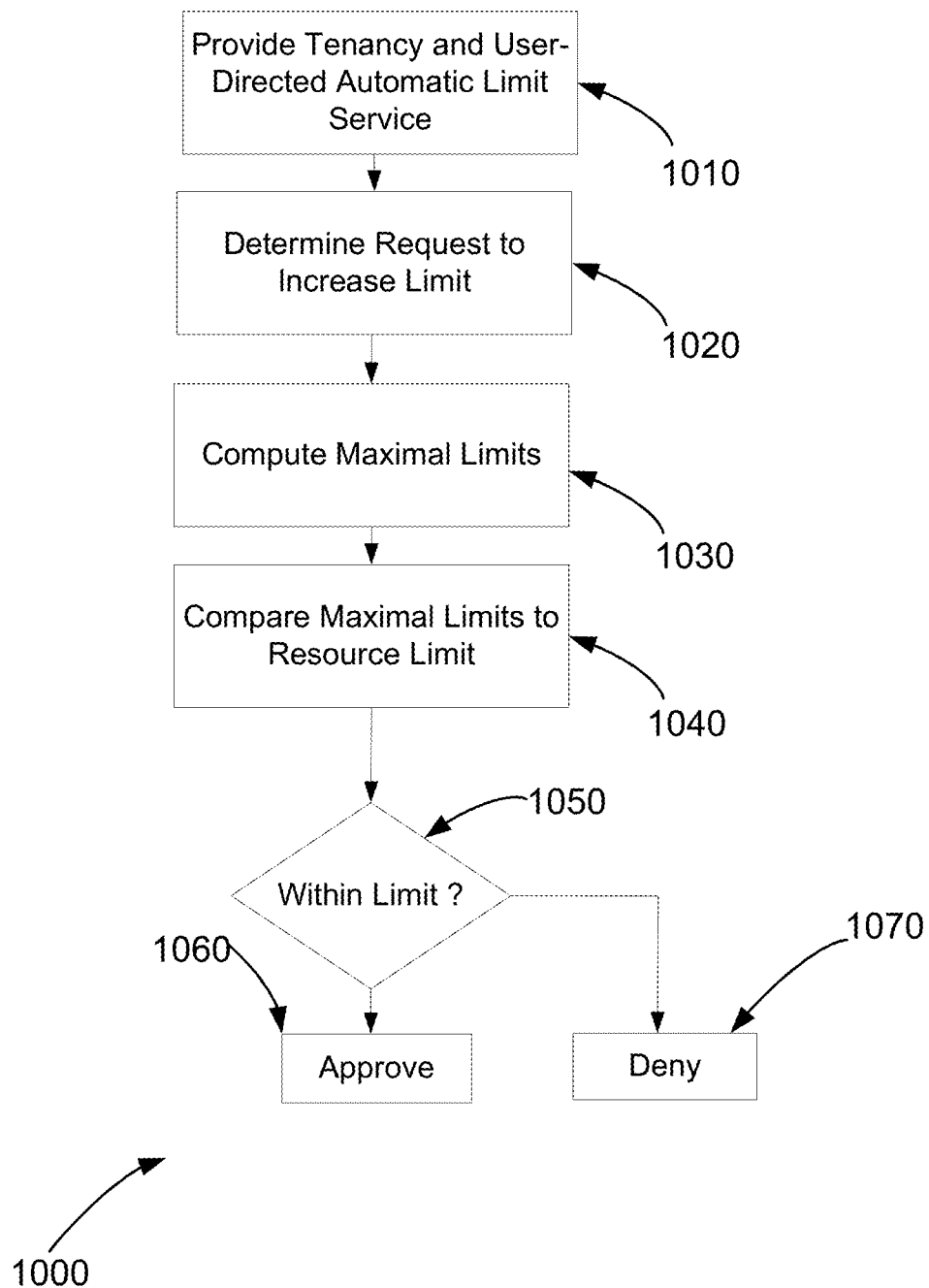
FIG. 10 is a flow diagram showing a method for user-directed automatic service limit adjustment in a multitenant environment in accordance with an example embodiment.

FIG. 10 is a flow diagram showing a method 1000 for user-directed automatic service limit adjustment in a multi-tenant environment including a plurality of regions in accordance with an example embodiment. A computer comprising one or more microprocessors is provided defining a tenancy within the plurality of regions of the associated cloud infrastructure environment, together with providing a limit service in step 1010 automatically increasing a service limit in the tenancy. In the example embodiment, the limit service includes a plurality of limits associated with one or more cloud resources. The limit service determines in step 1020 a request to increase a limit associated with a cloud resource of the one or more cloud resources, wherein the request is associated with a first tenant of the plurality of tenants.

The limit service computes in step 1030 a set of maximal limits associated with the first tenant, and compares the requested increase with the limit associated with the cloud resource in step 1040.

Upon finding in step 1050 that the requested increase to the limit associated with the cloud resource to be less than each of the set of maximal limits, the limit service selectively approves the request in step 1060. The request is denied in step 1070 upon finding in step 1050 that the requested increase to the limit associated with the cloud resource is greater than or equal to any of the set of maximal limits. In accordance with an embodiment, the systems and methods described herein provide a self-service limit increase with automatic approval. Instead of manually reviewing and approving a request for a service limit increase, the system can review the limit increase request and approve the request if it satisfies the all the rules defined by the system. Such rules can comprise the "Cloud account history" and the "Cloud account score" described above.

The determining the request to increase the limit associated with the cloud resource request includes in the example embodiment determining the request by the limit service based upon a received instruction from the tenant requesting the increase.

In accordance with an example embodiment and as shown in FIG. 10, systems and methods are provided for user-directed automatic service limit adjustment, wherein requests from users of selected tenants such as for example users of trusted tenants to increase contractual or other service limits placed on resource use and/or provisioning allocated to tenants of a cloud infrastructure environment are automatically granted to the requesting user. In that way, beneficially, users of trusted or other tenants may easily and efficiently provision or otherwise use resources by simply requesting an increase and without the disruption associated with supervisory manual review and approval of the resource requests when the tenant is at or near to the contractual or other service limits placed on the resources.

Figure 11:
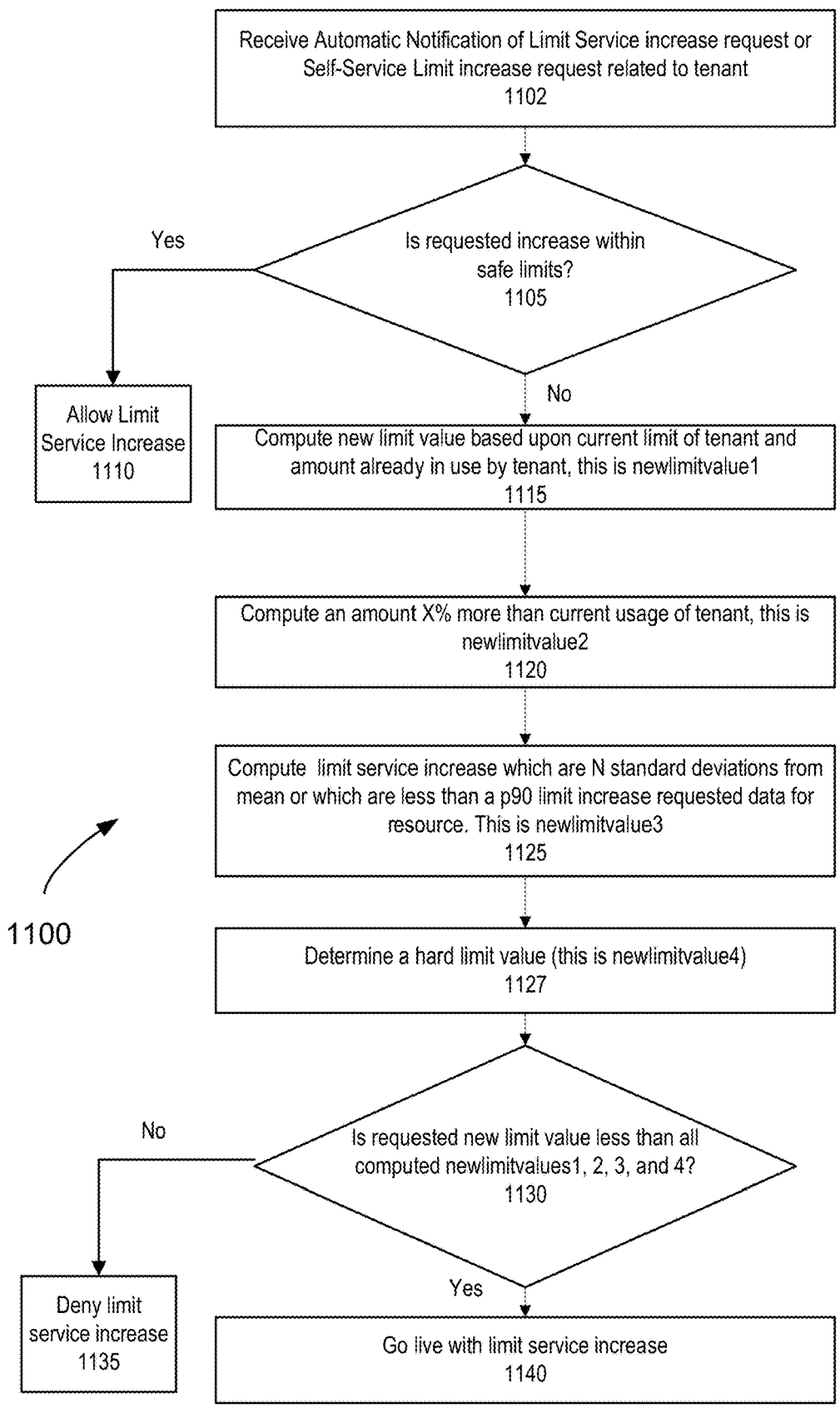
FIG. 11 is a flow diagram showing a method for automatic service level increase in a multitenant environment in accordance with an example embodiment.

FIG. 11 shows a flowchart of a method 1100 for automatic service level increase in a multitenant environment, in accordance with an embodiment.

In accordance with an embodiment, at step 1102, the method can receive, at, for example, a limits service, an automatic notification of a limit service increase request or a self-service limit service increase request, wherein the request is related to a tenant within a multi-tenant cloud service environment.

In accordance with an embodiment, at step 1105, the method can determine if the limit service increase is within a safe limit for the tenant. If so, then at step 1110, the limit increase can be automatically allowed.

If not, in accordance with an embodiment, at step 1115, the limits service can compute a new limit value based upon a current limit of the tenant as well as an amount of resources that the tenant already has in use. This can correspond to a new value of "newlimitvalue1".

In accordance with an embodiment, at step 1120, the limits service can compute an amount that is X % (e.g., 50%) greater than the current usage of the tenant. This can correspond to a value of "newlimitvalue2".

In accordance with an embodiment, at step 1125, the limits service can compute a limit service increase which are N standard deviations from the mean or which are less than a p90 limit increase for requested data for the resource. This can correspond to a value of "newlimitvalue3".

In accordance with an embodiment, at step 1127, the limits service can compute a hard limit value for the system. This can correspond to a value of "newlimitvalue4".

In accordance with an embodiment, at step 1130, the limits service can determine if the requested new limits value is less than or equal to each of newlimitsvalue1, newlimitsvalue2, newlimitsvalue3, newlimitsvalue4 (e.g., is NewLimitsValue<=MIN(newlimitsvalue1, newlimitsvalue2, newlimitsvalue3, newlimitsvalue4). If not, then at 635, the method can deny the service limit increase, in which case the request can optionally be transferred on for manual intervention.

In accordance with an embodiment, at step 1140, if the new limits value is less than or equal to the MIN(newlimitsvalue1, newlimitsvalue2, newlimitsvalue3, newlimitsvalue4), then the request can be automatically approved.

Managing Lifecycle of Limit Increase Request

In accordance with an embodiment, the systems and methods described herein can allow for a tenant to view and manage the lifecycle state of a limit increase request. This can help the customer to track the status of a limit increase request or to automate the deployment using scripts. For every limit increase request that is created, an asynchronous work request which can be used to track the request status can also be triggered. The systems and methods can notify the customer once the limit increase request has completed.

In accordance with various embodiments, additional features are described in the attached appendices, which are herein incorporated by reference.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art. For example, although several of the examples provided herein illustrate use with enterprise software applications components such as Oracle Fusion Applications; cloud environments such as Oracle Cloud Infrastructure; and cloud services such as Oracle Fusion Analytics; in accordance with various embodiments, the systems and methods described herein can be used with other types of enterprise software applications, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for automatic service limit increase in an associated cloud infrastructure environment including a plurality of regions, the system comprising:
    a computer comprising one or more microprocessors;
    a tenancy defined within the plurality of regions of the associated cloud infrastructure environment; and
    a memory device operatively coupled with the computer, the memory device storing limit service logic executable by the computer to perform a limit service for providing the automatic service limit increase in the tenancy, the limit service comprising a plurality of limits associated with one or more cloud resources,
    wherein a request to increase a limit associated with a cloud resource of the one or more cloud resources is determined by the limit service, wherein the request is associated with a first tenant of the plurality of tenants,
    wherein the limit service computes a set of maximal limits associated with the first tenant,
    wherein the limit service compares the requested increase with the limit associated with the cloud resource,
    wherein the limit service approves the request upon finding that the requested increase to the limit associated with the cloud resource to be less than each of said set of maximal limits.

2. The system according to claim 1, wherein:
    the limit service computes each maximal limit of the set of maximal limits associated with the first tenant upon at least one of a current usage of the tenant, a hard maximum of the cloud resource, a percentage increase of the tenant, and an average of the tenant usage.

3. The system according to claim 1, wherein:
    the request to increase the limit associated with the cloud resource of the one or more cloud resources is automatically generated by the limit service based upon the tenant's usage of the cloud resource.

4. The system according to claim 3, wherein:
    the request to increase the limit associated with the cloud resource of the one or more cloud resources is automatically generated by the limit service without input to the limit service from the tenant.

5. The system according to claim 1, wherein:
    the request to increase the limit associated with the cloud resource of the one or more cloud resources is determined by the limit service based upon a received instruction from the tenant requesting the increase.

6. The system according to claim 1, wherein:
    the limit service selectively receives an opt out request from the tenant;
    the limit service:
        based on receiving the opt out request from the tenant, determines the request to increase the limit based upon a received instruction from the tenant requesting the increase, or
        based on not receiving the opt out request from the tenant, automatically generates the request to increase the limit associated with the cloud resource of the one or more cloud resources.

7. The system according to claim 1, wherein:
    wherein upon finding that the requested increase to the limit associated with the cloud resource to be greater than or equal to any of said set of maximal limits the limit service:
        disapproves the request;
        notifies a user of the tenant requesting the increase that the request was disapproved; and
        generates an exception service operable to couple the user of the tenant requesting the increase with an operational engineer for communicating additional information between the user and the operational engineer for further re-requesting the increase in service based on the additional information communicated between the user and the operational engineer.

8. A method for automatic service limit increase in an associated cloud infrastructure environment including a plurality of regions, the method comprising:
    providing a computer comprising one or more microprocessors;
    defining a tenancy within the plurality of regions of the associated cloud infrastructure environment;
    providing a limit service automatically increasing a service limit in the tenancy, the limit service comprising a plurality of limits associated with one or more cloud resources,
    determining by the limit service a request to increase a limit associated with a cloud resource of the one or more cloud resources, wherein the request is associated with a first tenant of the plurality of tenants;
    computing by the limit service a set of maximal limits associated with the first tenant;
    comparing by the limit service the requested increase with the limit associated with the cloud resource; and
    selectively approving by the limit service the request upon finding that the requested increase to the limit associated with the cloud resource to be less than each of said set of maximal limits.

9. The method according to claim 8, wherein:
the computing comprises computing by the limit service each maximal limit of the set of maximal limits associated with the first tenant upon at least one of a current usage of the tenant, a hard maximum of the cloud resource, a percentage increase of the tenant, and an average of the tenant usage.

10. The method according to claim 8, wherein:
the determining the request to increase the limit associated with the cloud resource request comprises automatically generating by the limit service the request to increase the limit associated with the cloud resource of the one or more cloud resources based upon the tenant's usage of the cloud resource.

11. The method according to claim 10, wherein:
the automatically generating the request to increase the limit associated with the cloud resource comprises automatically generating by the limit service the request to increase the limit without input to the limit service from the tenant.

12. The method according to claim 8, wherein:
the determining the request to increase the limit associated with the cloud resource of the one or more cloud resources comprises determining the request by the limit service based upon a received instruction from the tenant requesting the increase.

13. The method according to claim 8, further comprising:
selectively receiving an opt out request by the limit service from the tenant;
the limit service:
based on receiving the opt out request from the tenant, determining the request to increase the limit based upon a received instruction from the tenant requesting the increase, or
based on not receiving the opt out request from the tenant, automatically generating the request to increase the limit associated with the cloud resource of the one or more cloud resources.

14. The method according to claim 8, further comprising:
upon finding that the requested increase to the limit associated with the cloud resource to be greater than or equal to any of said set of maximal limits the limit service, the limit service:
disapproving the request;
notifying a user of the tenant requesting the increase that the request was disapproved; and
generating an exception service operable to couple the user of the tenant requesting the increase with an operational engineer for communicating additional information between the user and the operational engineer for further re-requesting the increase in service based on the additional information communicated between the user and the operational engineer.

15. A non-transitory computer readable storage medium having instructions thereon for automatic service limit increase in an associated cloud infrastructure environment including a plurality of regions, that when read and executed by a computer cause the computer to perform steps comprising:
providing a computer comprising one or more microprocessors;
defining a tenancy within the plurality of regions of the associated cloud infrastructure environment;
providing a limit service automatically increasing a service limit in the tenancy, the limit service comprising a plurality of limits associated with one or more cloud resources,
determining by the limit service a request to increase a limit associated with a cloud resource of the one or more cloud resources, wherein the request is associated with a first tenant of the plurality of tenants;
computing by the limit service a set of maximal limits associated with the first tenant;
comparing by the limit service the requested increase with the limit associated with the cloud resource; and
selectively approving by the limit service the request upon finding that the requested increase to the limit associated with the cloud resource to be less than each of said set of maximal limits.

16. The non-transitory computer readable storage medium according to claim 15, wherein:
the computing comprises computing by the limit service each maximal limit of the set of maximal limits associated with the first tenant upon at least one of a current usage of the tenant, a hard maximum of the cloud resource, a percentage increase of the tenant, and an average of the tenant usage.

17. The non-transitory computer readable storage medium according to claim 15, wherein:
the determining the request to increase the limit associated with the cloud resource request comprises automatically generating by the limit service the request to increase the limit associated with the cloud resource of the one or more cloud resources based upon the tenant's usage of the cloud resource.

18. The non-transitory computer readable storage medium according to claim 17, wherein:
the automatically generating the request to increase the limit associated with the cloud resource comprises automatically generating by the limit service the request to increase the limit without input to the limit service from the tenant.

19. The non-transitory computer readable storage medium according to claim 15, wherein:
the determining the request to increase the limit associated with the cloud resource of the one or more cloud resources comprises determining the request by the limit service based upon a received instruction from the tenant requesting the increase.

20. The non-transitory computer readable storage medium according to claim 15, further comprising:
selectively receiving an opt out request by the limit service from the tenant;
the limit service:
based on receiving the opt out request from the tenant, determining the request to increase the limit based upon a received instruction from the tenant requesting the increase, or
based on not receiving the opt out request from the tenant, automatically generating the request to increase the limit associated with the cloud resource of the one or more cloud resources.

* * * * *

UNITED STATES PATENT AND TRADEMARK OFFICE
CERTIFICATE OF CORRECTION

PATENT NO. : 11,397,621 B2
APPLICATION NO. : 17/006639
DATED : July 26, 2022
INVENTOR(S) : Newman et al.

It is certified that error appears in the above-identified patent and that said Letters Patent is hereby corrected as shown below:

On the Title Page

Page 2, Column 2, item [56], under Other Publications, Line 12, delete "v2.519/" and insert -- v2.5.19/ --, therefor.

In the Specification

Column 1, Line 8, delete "Applications" and insert -- Application --, therefor.

Column 1, Line 13, delete "Applications" and insert -- Application --, therefor.

Column 18, Line 32, delete "domains.)." and insert -- domains). --, therefor.

Column 21, Lines 18-19, delete "Math.Min(NewLimitValuel,NewLimitValue2,NewLimitValue3,NewLimitValue4)." and insert -- Math.Min(NewLimitValue1, NewLimitValue2, NewLimitValue3, NewLimitValue4). --, therefor.

Signed and Sealed this
Twenty-seventh Day of December, 2022

Katherine Kelly Vidal
*Director of the United States Patent and Trademark Office*